(12) United States Patent
Chen et al.

(10) Patent No.: US 12,032,410 B2
(45) Date of Patent: Jul. 9, 2024

(54) DISPLAY METHOD FOR FLEXIBLE DISPLAY, AND TERMINAL

(71) Applicant: Huawei Technologies Co., Ltd., Shenzhen (CN)

(72) Inventors: Xiaoxiao Chen, Nanjing (CN); Hao Chen, Shenzhen (CN); Qi Sun, Xi'an (CN); Kai Hu, Wuhan (CN); Zhen An, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 17/253,869

(22) PCT Filed: Jun. 29, 2018

(86) PCT No.: PCT/CN2018/093858
§ 371 (c)(1),
(2) Date: Dec. 18, 2020

(87) PCT Pub. No.: WO2020/000448
PCT Pub. Date: Jan. 2, 2020

(65) Prior Publication Data
US 2021/0263564 A1   Aug. 26, 2021

(51) Int. Cl.
*G06F 1/16* (2006.01)
*G06F 3/04886* (2022.01)
(Continued)

(52) U.S. Cl.
CPC .......... *G06F 1/1652* (2013.01); *G06F 1/1616* (2013.01); *G06F 3/04886* (2013.01);
(Continued)

(58) Field of Classification Search
CPC .... G06F 1/1652; G06F 1/1616; G06F 1/1641; G06F 3/04886; G06F 9/451;
(Continued)

(56) References Cited

U.S. PATENT DOCUMENTS 9,043,714 B1 * 5/2015 Queru ................. G06F 3/04886
463/32
9,860,474 B2   1/2018 Park et al.
(Continued)

FOREIGN PATENT DOCUMENTS

CN   103514826 A   1/2014
CN   104571979 A   4/2015
(Continued)

*Primary Examiner* — Asher D Kells
(74) *Attorney, Agent, or Firm* — Conley Rose, P.C.

(57) ABSTRACT

A display method for a flexible display includes receiving, by a terminal from a user, a first operation of enabling a first application on a flexible display, where the flexible display is in a first physical state, displaying, by the terminal, an application window of the first application in a first effective display area on the flexible display, detecting, by the terminal, that the flexible display is switched from the first physical state to a second physical state, and displaying, by the terminal, the application window of the first application in a second effective display area on the flexible display, where the second effective display area is different from the first effective display area.

20 Claims, 17 Drawing Sheets

(51) Int. Cl.
*G06F 9/451* (2018.01)
*H04M 1/02* (2006.01)

(52) U.S. Cl.
CPC .......... *G06F 9/451* (2018.02); *H04M 1/0214* (2013.01); *H04M 1/0268* (2013.01)

(58) Field of Classification Search
CPC ...... G06F 2203/04102; H04M 1/0214; H04M 1/0268; G09F 9/301; H01L 2251/5338; H01L 51/0097; G09G 2380/02; G09G 3/035; G09G 2340/0442
See application file for complete search history.

(56) References Cited

U.S. PATENT DOCUMENTS

| | | | | |
|---|---|---|---|---|
| 11,137,889 | B2* | 10/2021 | Beerana | G06F 3/04845 |
| 2010/0060547 | A1* | 3/2010 | Bloebaum | G06F 1/1641 |
| | | | | 345/1.3 |
| 2013/0076655 | A1 | 3/2013 | Sirpal et al. | |
| 2013/0127918 | A1 | 5/2013 | Kang et al. | |
| 2013/0342439 | A1 | 12/2013 | Kwack et al. | |
| 2014/0380186 | A1* | 12/2014 | Kim | G06F 1/1677 |
| | | | | 715/746 |
| 2015/0097755 | A1 | 4/2015 | Kim | |
| 2015/0338888 | A1* | 11/2015 | Kim | G06F 1/1643 |
| | | | | 345/156 |
| 2016/0196805 | A1* | 7/2016 | Chen | G06F 3/1446 |
| | | | | 345/667 |
| 2016/0321969 | A1* | 11/2016 | Kambhatla | G09G 3/035 |
| 2017/0090681 | A1 | 3/2017 | Gao et al. | |
| 2017/0154609 | A1* | 6/2017 | Yoon | G06F 3/0483 |
| 2017/0177096 | A1* | 6/2017 | Cheong | G06F 3/1454 |
| 2017/0256238 | A1 | 9/2017 | Zhu et al. | |
| 2018/0018753 | A1 | 1/2018 | Mclaughlin | |
| 2018/0039408 | A1 | 2/2018 | Cheong et al. | |
| 2018/0219987 | A1* | 8/2018 | Pantel | H10K 59/40 |
| 2019/0019476 | A1* | 1/2019 | Ge | G06F 3/048 |
| 2019/0261519 | A1* | 8/2019 | Park | H05K 5/0017 |

FOREIGN PATENT DOCUMENTS

| | | | |
|---|---|---|---|
| CN | 105224273 | A | 1/2016 |
| CN | 105808189 | A | 7/2016 |
| CN | 106919329 | A | 7/2017 |
| CN | 107103840 | A | 8/2017 |
| CN | 107423011 | A | 12/2017 |
| CN | 107659837 | A | 2/2018 |
| CN | 108076292 | A | 5/2018 |
| CN | 108200268 | A | 6/2018 |
| WO | 2019164315 | A1 | 8/2019 |

\* cited by examiner

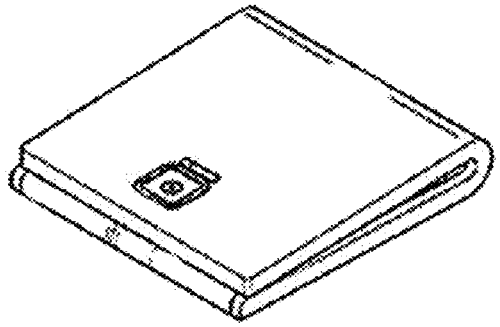 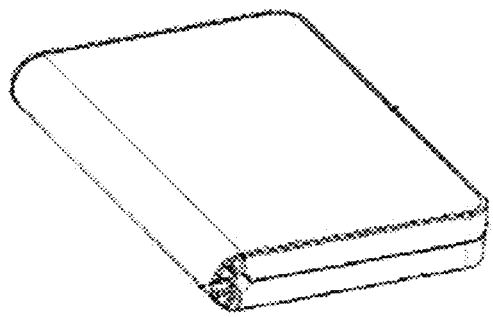
FIG. 4(a)  FIG. 4(b)
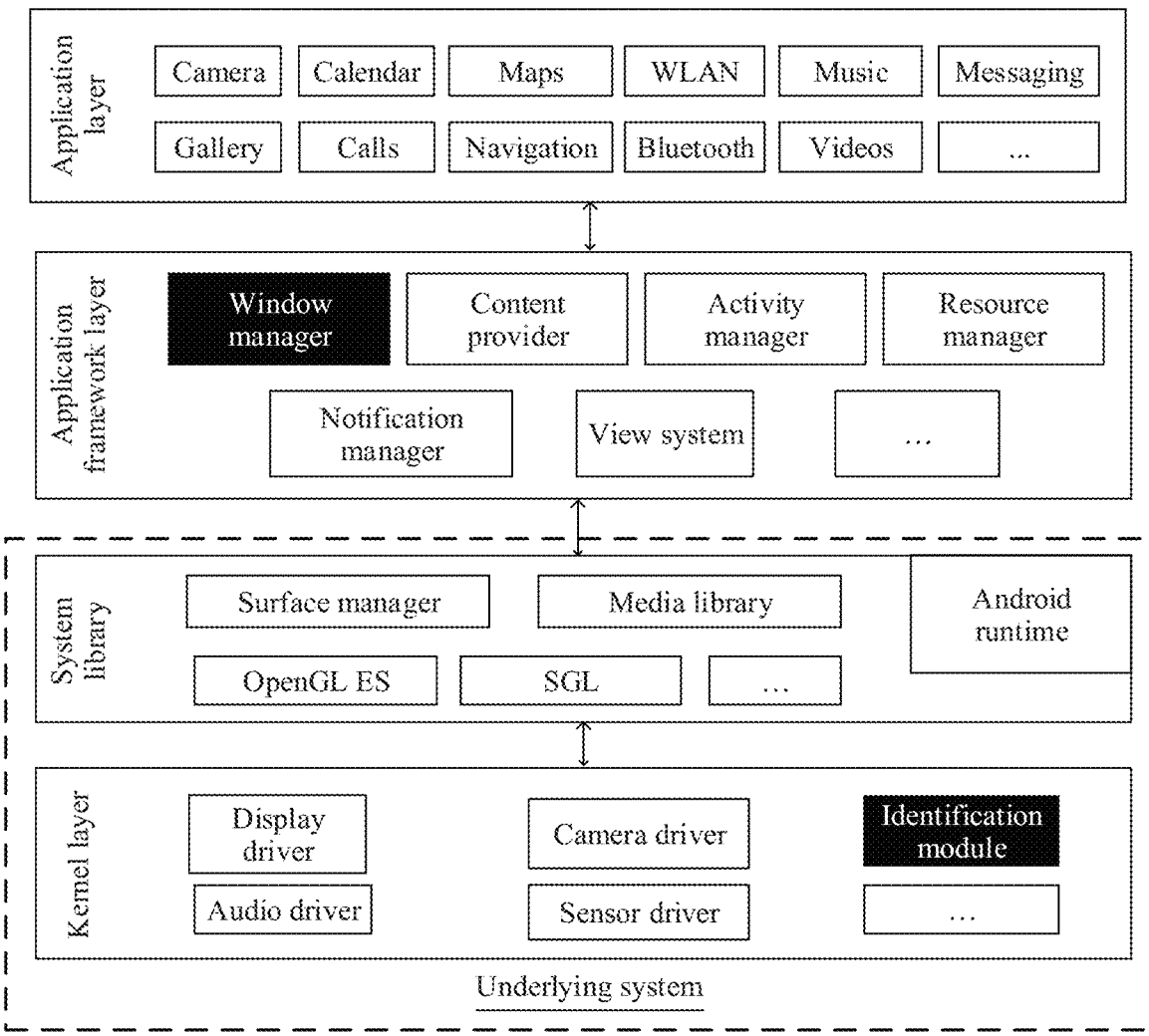
FIG. 5

If a first application supports any display aspect ratio:

If a display aspect ratio supported by a first application is less than an aspect ratio of a first effective display area

DISPLAY METHOD FOR FLEXIBLE DISPLAY, AND TERMINAL

CROSS-REFERENCE TO RELATED APPLICATIONS

This application is a U.S. National Stage of International Patent Application No. PCT/CN2018/093858 filed on Jun. 29, 2018, which is hereby incorporated by reference in its entirety.

TECHNICAL FIELD

Embodiments of this application relate to the terminal field, and in particular, to a display method for a flexible display, and a terminal.

BACKGROUND

A flexible display may also be referred to as a flexible OLED (organic light-emitting diode, organic light-emitting diode). Compared with a conventional display, the flexible display is lighter and slimmer in size, and in addition, because the flexible display is bendable and has great flexibility, the flexible display has higher durability than the conventional display.

Currently, some manufacturers have applied the flexible display to terminals such as a mobile phone and a tablet. As shown in FIG. 1, when using a mobile phone having a flexible display, a user may fold the display. In this case, the mobile phone is more flexible and portable. However, after the display is folded, displayed content on the display is segmented accordingly. After the display is folded, the displayed content is separately displayed on two planes (namely, a plane 01 and a plane 02). Because there is an included angle between the plane 01 and the plane 02, it is very inconvenient for the user to watch and operate the mobile phone.

SUMMARY

Embodiments of this application provide a display method for a flexible display, and a terminal. A display layout of the flexible display may be adjusted based on a physical state of the flexible display, so that the flexible display can provide a user with better use experience in different physical states.

According to a first aspect, an embodiment of this application provides a display method for a flexible display, including: receiving, by a terminal, a first operation of enabling a first application by a user on the flexible display, where in this case, the flexible display is in a first physical state; displaying, by the terminal, an application window of the first application in a first effective display area on the flexible display; if the terminal detects that the flexible display is switched from the first physical state to a second physical state, displaying, by the terminal, the application window of the first application in a second effective display area (the second effective display area is different from the first effective display area) on the flexible display. In this way, as a physical state of the flexible display changes, the terminal may still display an application window of an application at a proper location on a folded display or an unfolded display, so that the user can obtain relatively good watching and operation experience when the flexible display is folded or unfolded.

In a possible design method, after the receiving, by a terminal, a first operation of enabling a first application by a user on the flexible display, the method further includes: obtaining, by the terminal, display layout information of the first application, where the display layout information is used to indicate a display aspect ratio supported when the first application is displayed; and determining, by the terminal, the first effective display area on the flexible display in the first physical state; and in this case, the displaying, by the terminal, an application window of the first application in a first effective display area on the flexible display specifically includes: displaying, by the terminal, the application window of the first application in the first effective display area based on the display layout information of the first application. In other words, the terminal may create a corresponding window in an effective display area with reference to an actual physical state of the flexible display and a display aspect ratio supported by an application, and display to-be-displayed content in the window.

In a possible design method, the determining, by the terminal, the first effective display area on the flexible display in the first physical state specifically includes; obtaining, by the terminal, physical state information of the flexible display, where physical states of the flexible display include a folded state and an unfolded state; and determining, by the terminal, the first effective display area on the flexible display based on the physical state information, where when the flexible display is in the unfolded state, the first effective display area is the entire flexible display; or when the flexible display is in the folded state, the first effective display area is an area that is obtained by dividing the flexible display along a folding line. The terminal may obtain a system parameter of a display resolution from an underlying display system, and further determine a physical state of a current flexible display based on the display resolution. Alternatively, the terminal may obtain physical state information of a current flexible display from an identification module. This is not limited in this embodiment of this application.

In a possible design method, the displaying, by the terminal, the application window of the first application in the first effective display area based on the display layout information of the first application specifically includes: If the first application supports any display aspect ratio, it indicates that an appropriate display layout resource of the first application can be determined for displaying regardless of an actual physical state of the current flexible display. Therefore, the terminal may display the application window of the first application in full screen in the first effective display area, to improve watching experience of the user. Alternatively, if the display aspect ratio supported by the first application is not less than an aspect ratio of the first effective display area, it indicates that a display layout resource of the first application can adapt to the entire first effective display area. Therefore, the terminal may also display the application window of the first application in full screen in the first effective display area. Alternatively, if the display aspect ratio supported by the first application is less than an aspect ratio of the first effective display area, it indicates that a display layout resource of the first application cannot completely fill the entire first effective display area. Therefore, the terminal may display the application window of the first application in a first area based on the display aspect ratio supported by the first application, and the first area is located in the first effective display area.

In a possible design method, if the display aspect ratio supported by the first application is less than the aspect ratio of the first effective display area, the method further includes: displaying, by the terminal, at least one shortcut key in a second area (the second area is an area other than the first area in the first effective display area). Therefore, when the terminal runs the first application, the user may further implement another shortcut function by using these shortcut keys.

In a possible design method, the terminal stores an application configuration list, and the application configuration list includes at least one application and a maximum display aspect ratio actually supported by the application; and the displaying, by the terminal, an application window of the first application in a first effective display area on the flexible display specifically includes: if the application configuration list includes the first application, displaying, by the terminal, the application window of the first application in the first effective display area based on a maximum display aspect ratio supported by the first application in the application configuration list. In this way, a problem that an optimal application window cannot be created for the user when a display aspect ratio that can be supported by the application and that is specified in display layout information of the application is inconsistent with the display aspect ratio that can be actually supported by the application can be avoided.

In a possible design method, that the terminal detects that the flexible display is switched from the first physical state to a second physical state includes: when physical state information currently obtained by the terminal is different from physical state information obtained last time, determining, by the terminal, that the flexible display is switched from the first physical state to the second physical state.

In a possible design method, after the terminal detects that the flexible display is switched from the first physical state to the second physical state, the method further includes: determining, by the terminal, the second effective display area on the flexible display in the second physical state; and the displaying, by the terminal, the application window of the first application in a second effective display area on the flexible display includes: displaying, by the terminal, the application window of the first application in the second effective display area based on the display layout information of the first application.

In a possible design method, the displaying, by the terminal, the application window of the first application in the second effective display area based on the display layout information of the first application includes: If the first application supports any display aspect ratio, it indicates that regardless of an actual physical state of a flexible display of a current mobile phone, a corresponding display layout resource of the first application can be arranged for displaying. Therefore, the terminal may display the application window of the first application in full screen in the second effective display area. Otherwise, the terminal displays the application window of the first application in the second effective display area based on a resolution that is of the application window of the first application in the first effective display area and that exists before a physical state of the flexible display changes.

In a possible design method, if it is specified, in the display layout information of the first application, that the first application supports a fixed display aspect ratio, that the terminal displays the application window of the first application in the second effective display area based on a resolution of the application window of the first application in the first effective display area specifically includes: If an aspect ratio of the application window of the first application in the first effective display area is the same as an aspect ratio of the second effective display area, it indicates that the application window of the first application in the first effective display area may fill the entire second effective display area after the application window of the first application in the first effective display area is scaled down/up proportionally or after a location of the application window of the first application in the first effective display area is adjusted. Therefore, the terminal may display the application window of the first application in full screen in the second effective display area. Alternatively, if an aspect ratio of the application window of the first application in the first effective display area is different from an aspect ratio of the second effective display area, a fault may occur if the terminal forcibly displays the application window of the first application in full screen in the second effective display area. Therefore, the terminal may scale down/up the application window of the first application, and then display the scaled-down/up application window in the second effective display area. In this case, the application window of the first application cannot be displayed in full screen in the second effective display area.

In a possible design method, that the terminal scales down/up the application window of the first application, and then displays the scaled-down/up application window in the second effective display area includes: scaling, by the terminal, down/up the application window proportionally based on the aspect ratio of the application window of the first application in the first effective display area; and displaying, by the terminal, the scaled-down/up application window in the second effective display area. Certainly, the terminal scales down/up the application window in the first effective display area based on a non-proportional relationship, and then displays the scaled-down/up application window in the second effective display area.

In a possible design method, after the terminal detects that the flexible display is switched from the first physical state to the second physical state, the method further includes: closing, by the terminal, the application window of the first application in the first effective display area. For example, if two display resolutions consecutively obtained by the terminal from the underlying display system are different, it may be determined that the current flexible display is switched from the first physical state to the second physical state. The parameter of the display resolution is a system-level parameter. Therefore, when the display resolution changes, the terminal needs to end the running first application, and then recreates the application window of the first application on the flexible display in the second physical state according to the foregoing method. For another example, after the terminal detects that the flexible display is switched from the first physical state to the second physical state, if it is specified, in the display layout information of the first application, that the first application supports a fixed display aspect ratio, the terminal may first destroy the created application window of the first application in the first effective display area, end a process of the first application, and recreate the application window of the first application on the flexible display in the second physical state according to the foregoing method.

According to a second aspect, an embodiment of this application provides a display method for a flexible display. Physical states of the flexible display include a folded state and an unfolded state, and the method includes: receiving, by a terminal, a first operation of enabling a first application by a user on the flexible display, where the flexible display is in a first physical state; obtaining, by the terminal, display layout information of the first application, where the display layout information is used to indicate a display aspect ratio supported when the first application is displayed, determining, by the terminal, a first effective display area on the flexible display in the first physical state; and displaying, by the terminal, an application window of the first application in the first effective display area based on the display layout information of the first application. In this way, the terminal may create a corresponding window in an effective display area with reference to an actual physical state of the flexible display and a display aspect ratio supported by an application, and display to-be-displayed content in the window, so that the user can obtain relatively good watching and operation experience when the flexible display is folded or unfolded.

In a possible design method, the determining, by the terminal, a first effective display area on the flexible display in the first physical state includes: obtaining, by the terminal, physical state information of the flexible display, where the physical states of the flexible display include the folded state and the unfolded state; and determining, by the terminal, the first effective display area on the flexible display based on the physical state information, where when the flexible display is in the unfolded state, the first effective display area is the entire flexible display; or when the flexible display is in the folded state, the first effective display area is an area that is obtained by dividing the flexible display along a folding line.

In a possible design method, the displaying, by the terminal, an application window of the first application in the first effective display area based on the display layout information of the first application includes: if the first application supports any display aspect ratio, displaying, by the terminal, the application window of the first application in full screen in the first effective display area; or if the display aspect ratio supported by the first application is not less than an aspect ratio of the first effective display area, displaying, by the terminal, the application window of the first application in full screen in the first effective display area; or if the display aspect ratio supported by the first application is less than an aspect ratio of the first effective display area, displaying, by the terminal, the application window of the first application in a first area based on the display aspect ratio supported by the first application, where the first area is located in the first effective display area.

In a possible design method, if the display aspect ratio supported by the first application is less than the aspect ratio of the first effective display area, the method further includes: displaying, by the terminal, at least one shortcut key in a second area, where the second area is an area other than the first area in the first effective display area.

In a possible design method, the terminal stores an application configuration list, and the application configuration list includes at least one application and a maximum display aspect ratio actually supported by the application; and that the terminal displays the application window of the first application in the first effective display area on the flexible display includes: if the application configuration list includes the first application, displaying, by the terminal, the application window of the first application in the first effective display area based on a maximum display aspect ratio supported by the first application in the application configuration list.

In a possible design method, after the displaying, by the terminal, an application window of the first application in the first effective display area based on the display layout information of the first application, the method further includes: detecting, by the terminal, that the flexible display is switched from the first physical state to a second physical state, and displaying, by the terminal, the application window of the first application in a second effective display area on the flexible display, where the second effective display area is different from the first effective display area.

In a possible design method, the detecting, by the terminal, that the flexible display is switched from the first physical state to a second physical state includes: when physical state information currently obtained by the terminal is different from physical state information obtained last time, determining, by the terminal, that the flexible display is switched from the first physical state to the second physical state.

In a possible design method, after the detecting, by the terminal, that the flexible display is switched from the first physical state to a second physical state, the method further includes: determining, by the terminal, the second effective display area on the flexible display in the second physical state; and the displaying, by the terminal, the application window of the first application in a second effective display area on the flexible display includes: displaying, by the terminal, the application window of the first application in the second effective display area based on the display layout information of the first application.

In a possible design method, the displaying, by the terminal, the application window of the first application in the second effective display area based on the display layout information of the first application includes: if the first application supports any display aspect ratio, displaying, by the terminal, the application window of the first application in full screen in the second effective display area; otherwise, displaying, by the terminal, the application window of the first application in the second effective display area based on a resolution of the application window of the first application in the first effective display area.

In a possible design method, the displaying, by the terminal, the application window of the first application in the second effective display area based on a resolution of the application window of the first application in the first effective display area includes: if an aspect ratio of the application window of the first application in the first effective display area is the same as an aspect ratio of the second effective display area, displaying, by the terminal, the application window of the first application in full screen in the second effective display area; or if an aspect ratio of the application window of the first application in the first effective display area is different from an aspect ratio of the second effective display area, scaling, by the terminal, down/up the application window of the first application, and then displaying the scaled-down/up application window in the second effective display area.

In a possible design method, the scaling, by the terminal, down/up the application window of the first application, and then displaying the scaled-down/up application window in the second effective display area includes: scaling, by the terminal, down/up the application window proportionally based on the aspect ratio of the application window of the first application in the first effective display area; and displaying, by the terminal, the scaled-down/up application window in the second effective display area.

In a possible design method, after the detecting, by the terminal, that the flexible display is switched from the first physical state to a second physical state, the method further includes: closing, by the terminal, the application window of the first application in the first effective display area.

According to a third aspect, an embodiment of this application provides a terminal, including an obtaining unit, a display unit, and a detection unit. The obtaining unit is configured to receive a first operation of enabling a first application by a user on a flexible display, where the flexible display is in a first physical state. The display unit is configured to: display an application window of the first application in a first effective display area on the flexible display, and display the application window of the first application in a second effective display area on the flexible display, where the second effective display area is different from the first effective display area. The detection unit is configured to detect that the flexible display is switched from the first physical state to a second physical state.

In a possible design method, the obtaining unit is further configured to obtain display layout information of the first application, where the display layout information is used to indicate a display aspect ratio supported when the first application is displayed. The terminal further includes a determining unit, configured to determine the first effective display area on the flexible display in the first physical state. The display unit is specifically configured to display the application window of the first application in the first effective display area based on the display layout information of the first application.

In a possible design method, the obtaining unit is further configured to obtain physical state information of the flexible display, where physical states of the flexible display include a folded state and an unfolded state. The determining unit is specifically configured to determine the first effective display area on the flexible display based on the physical state information, where when the flexible display is in the unfolded state, the first effective display area is the entire flexible display; or when the flexible display is in the folded state, the first effective display area is an area that is obtained by dividing the flexible display along a folding line.

In a possible design method, the display unit is specifically configured to: if the first application supports any display aspect ratio, display the application window of the first application in full screen in the first effective display area; or if the display aspect ratio supported by the first application is not less than an aspect ratio of the first effective display area, display the application window of the first application in full screen in the first effective display area; or if the display aspect ratio supported by the first application is less than an aspect ratio of the first effective display area, display the application window of the first application in a first area based on the display aspect ratio supported by the first application, where the first area is located in the first effective display area.

In a possible design method, the display unit is further configured to display at least one shortcut key in a second area, where the second area is an area other than the first area in the first effective display area.

In a possible design method, the determining unit is further configured to: when physical state information currently obtained by the terminal is different from physical state information obtained last time, determine that the flexible display is switched from the first physical state to the second physical state.

In a possible design method, the determining unit is further configured to determine the second effective display area on the flexible display in the second physical state. The display unit is specifically configured to display the application window of the first application in the second effective display area based on the display layout information of the first application.

In a possible design method, the display unit is specifically configured to: if the first application supports any display aspect ratio, display the application window of the first application in full screen in the second effective display area; otherwise, display the application window of the first application in the second effective display area based on a resolution of the application window of the first application in the first effective display area.

In a possible design method, the display unit is specifically configured to: if an aspect ratio of the application window of the first application in the first effective display area is the same as an aspect ratio of the second effective display area, display the application window of the first application in full screen in the second effective display area; or if an aspect ratio of the application window of the first application in the first effective display area is different from an aspect ratio of the second effective display area, scale down/up the application window of the first application, and then display the scaled-down/up application window in the second effective display area.

In a possible design method, the display unit is specifically configured to: scale down/up the application window proportionally based on the aspect ratio of the application window of the first application in the first effective display area; and display the scaled-down/up application window in the second effective display area.

In a possible design method, the display unit is further configured to close the application window of the first application in the first effective display area.

According to a fourth aspect, an embodiment of this application provides a terminal, including an obtaining unit, a display unit, and a determining unit. The obtaining unit is configured to: receive a first operation of enabling a first application by a user on a flexible display, where the flexible display is in a first physical state; and obtain display layout information of the first application, where the display layout information is used to indicate a display aspect ratio supported when the first application is displayed. The determining unit is configured to determine the first effective display area on the flexible display in the first physical state. The display unit is configured to display an application window of the first application in the first effective display area based on the display layout information of the first application.

In a possible design method, the obtaining unit is further configured to obtain physical state information of the flexible display, where physical states of the flexible display include a folded state and an unfolded state. The determining unit is specifically configured to determine, by the terminal, the first effective display area on the flexible display based on the physical state information, where when the flexible display is in the unfolded state, the first effective display area is the entire flexible display; or when the flexible display is in the folded state, the first effective display area is an area that is obtained by dividing the flexible display along a folding line.

In a possible design method, the display unit is specifically configured to: if the first application supports any display aspect ratio, display the application window of the first application in full screen in the first effective display area; or if the display aspect ratio supported by the first application is not less than an aspect ratio of the first effective display area, display the application window of the first application in full screen in the first effective display area; or if the display aspect ratio supported by the first application is less than an aspect ratio of the first effective display area, display the application window of the first application in a first area based on the display aspect ratio supported by the first application, where the first area is located in the first effective display area.

In a possible design method, the display unit is further configured to display at least one shortcut key in a second area, where the second area is an area other than the first area in the first effective display area.

In a possible design method, the terminal further includes a detection unit, configured to detect that the flexible display is switched from the first physical state to a second physical state. The display unit is further configured to display the application window of the first application in a second effective display area on the flexible display, where the second effective display area is different from the first effective display area.

In a possible design method, the detection unit is specifically configured to: when physical state information currently obtained by the terminal is different from physical state information obtained last time, determine that the flexible display is switched from the first physical state to the second physical state.

In a possible design method, the determining unit is further configured to determine the second effective display area on the flexible display in the second physical state. The display unit is specifically configured to display, by the terminal, the application window of the first application in the second effective display area based on the display layout information of the first application.

In a possible design method, the display unit is specifically configured to: if the first application supports any display aspect ratio, display the application window of the first application in full screen in the second effective display area; otherwise, display the application window of the first application in the second effective display area based on a resolution of the application window of the first application in the first effective display area.

In a possible design method, the display unit is specifically configured to: if an aspect ratio of the application window of the first application in the first effective display area is the same as an aspect ratio of the second effective display area, display the application window of the first application in full screen in the second effective display area; or if an aspect ratio of the application window of the first application in the first effective display area is different from an aspect ratio of the second effective display area, scale down/up the application window of the first application, and then display the scaled-down/up application window in the second effective display area.

In a possible design method, the display unit is specifically configured to: scale down/up the application window proportionally based on the aspect ratio of the application window of the first application in the first effective display area; and display the scaled-down/up application window in the second effective display area.

In a possible design method, the display unit is further configured to close the application window of the first application in the first effective display area.

According to a fifth aspect, this application provides a terminal, including a flexible display, one or more processors, a memory, and one or more programs. The processor is coupled to the memory, and the one or more programs are stored in the memory. When the terminal runs, the processor executes the one or more programs stored in the memory, so that the terminal performs either one of the foregoing display methods for a flexible display.

According to a sixth aspect, this application provides a computer storage medium, including a computer instruction. When the computer instruction is run on a terminal, the terminal is enabled to perform the display method for a flexible display according to any design method in the first aspect.

According to a seventh aspect, this application provides a computer program product. When the computer program product is run on a computer, the computer is enabled to perform the display method for a flexible display according to any design method in the first aspect.

It may be understood that, the terminals in the third to the fifth aspects, the computer storage medium in the sixth aspect, and the computer program product in the seventh aspect that are provided above are all configured to perform the corresponding methods provided above. Therefore, for beneficial effects that can be achieved by the terminals, the computer storage medium, and the computer program product, refer to beneficial effects in the corresponding methods provided above. Details are not described again herein.

BRIEF DESCRIPTION OF DRAWINGS

FIG. 4(a) and FIG. 4(b) are a schematic diagram 2 of a flexible display according to an embodiment of this application;

FIG. 5 is a schematic architectural diagram of an operating system in a terminal according to an embodiment of this application;

DESCRIPTION OF EMBODIMENTS

A display method for a flexible display provided in the embodiments of this application may be applied to a terminal. For example, the terminal may be a mobile phone, a tablet, a desktop, a laptop, a notebook computer, an ultra-mobile personal computer (Ultra-mobile Personal Computer, UMPC), a handheld computer, a netbook, a personal digital assistant (Personal Digital Assistant, PDA), a wearable electronic device, a virtual reality device, or the like. A specific form of the terminal is not specially limited in the embodiments of this application.

Figure 1:
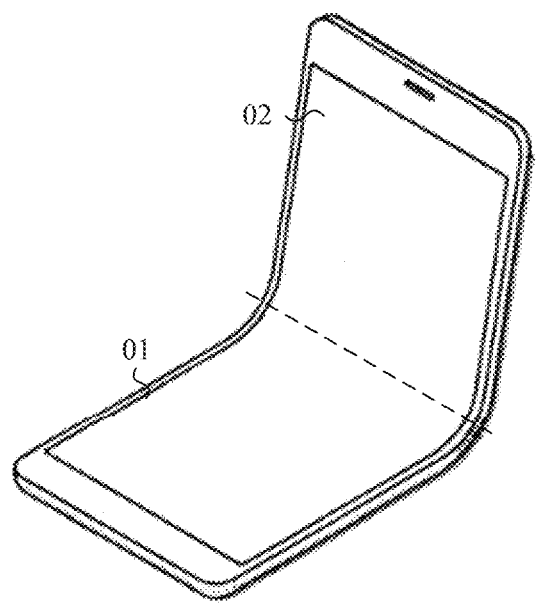
FIG. 1 is a schematic diagram of an application scenario of a flexible display in the prior art.
Figure 2:
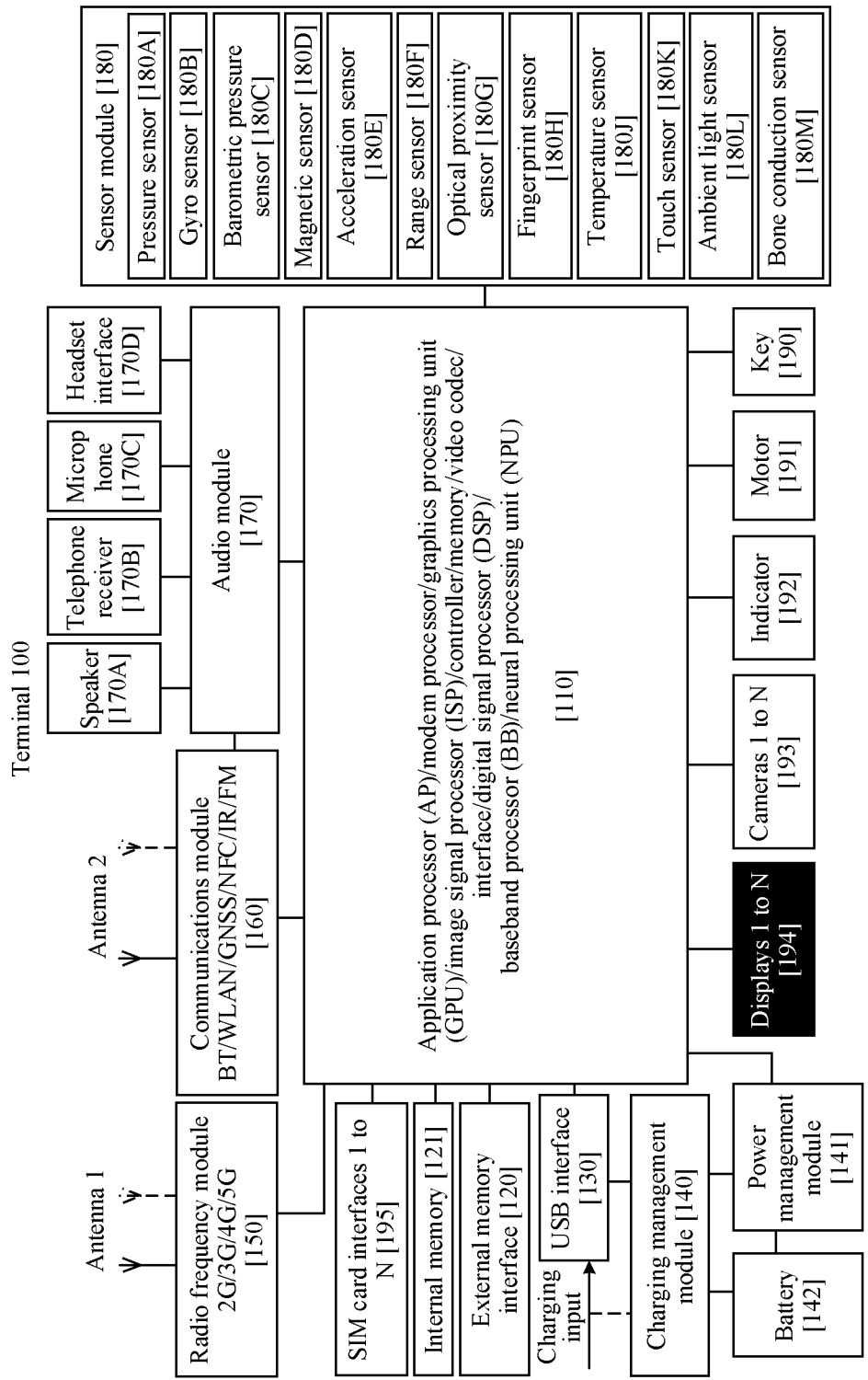
FIG. 2 is a schematic structural diagram 1 of a terminal according to an embodiment of this application.

FIG. 2 is a structural block diagram of a terminal 100 according to an embodiment of the present invention.

The terminal 100 may include a processor 110, an external memory interface 120, an internal memory 121, a USB interface 130, a charging management module 140, a power management module 141, a battery 142, an antenna 1, an antenna 2, a radio frequency module 150, a communications module 160, an audio module 170, a speaker 170A, a telephone receiver 170B, a microphone 170C, a headset interface 170D, a sensor module 180, a key 190, a motor 191, an indicator 192, a camera 193, a display 194, a SIM card interface 195, and the like. The sensor module may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The schematic structure in this embodiment of the present invention constitutes no limitation on the terminal 100. The terminal 100 may include more or fewer parts than those shown in the figure, or combine some parts, or split some parts, or have different part arrangements. The parts in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, and a video codec, a digital signal processor (digital signal processor, DSP), a baseband processor, and/or a neural processing unit (Neural-network Processing Unit, NPU). Different processing units may be independent components, or may be integrated into a same processor.

The controller may be a decision maker that directs each part of the terminal 100 to carry out coordinate work according to an instruction. The controller is a nerve center and a command center of the terminal 100. The controller generates an operation control signal based on an instruction operation code and a time sequence signal, to complete control of instruction reading and instruction execution.

A memory may be further disposed in the processor 110, and is configured to store an instruction and data. In some embodiments, the memory in the processor is a cache memory. The memory may store an instruction or data that is just used or cyclically used by the processor 110. If the processor needs to use the instruction or the data again, the processor may directly invoke the instruction or the data from the memory, to avoid repeated access and reduce a waiting time of the processor. Therefore, system efficiency is improved.

In some embodiments, the processor 110 may include an interface. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor may include a plurality of groups of I2C buses. The processor may be coupled to the touch sensor, a charger, a flash light, the camera, and the like by using different I2C bus interfaces. For example, the processor may be coupled to the touch sensor by using the I2C interface, so that the processor communicates with the touch sensor by using the I2C bus interface, to implement a touch function of the terminal 100.

The I2S interface may be used for audio communication. In some embodiments, the processor may include a plurality of groups of I2C buses. The processor 110 may be coupled to the audio module by using the I2S bus, to implement communication between the processor and the audio module. In some embodiments, the audio module may transfer an audio signal to the communications module by using the I2S interface, to implement a function of answering a call by using a Bluetooth headset.

The PCM interface may also be used for audio communication, and samples, quantizes, and encodes an analog signal. In some embodiments, the audio module may be coupled to the communications module by using a PCM bus interface. In some embodiments, the audio module may transfer an audio signal to the communications module by using the PCM interface, to implement the function of answering a call by using a Bluetooth headset. Both the I2S interface and the PCM interface may be used for audio communication, and sampling rates of the two interfaces are different.

The UART interface is a universal serial data bus, and is used for asynchronous communication. The bus is a bidirectional communication bus. The bus performs a conversion between serial communication and parallel communication on to-be-transmitted data. In some embodiments, the UART interface is usually configured to connect the processor to the communications module. For example, the processor communicates with a Bluetooth module by using the UART interface, to implement a Bluetooth function. In some embodiments, the audio module may transfer an audio signal to the communications module by using the UART interface, to implement the function of answering a call by using a Bluetooth headset.

The MIPI interface may be configured to connect the processor to a peripheral component such as a display or a camera. The MIPI interface includes a camera serial interface (camera serial interface, CSI), a display serial interface (display serial interface, DSI), and the like. In some embodiments, the processor communicates with the camera by using the CSI interface, to implement a photographing function of the terminal 100. The processor communicates with the display by using the DSI interface, to implement a display function of the terminal 100.

The GPIO interface may be configured by using software. The GPIO interface may be configured as a control signal, or may be configured as a data signal. In some embodiments, the GPIO interface may be configured to connect the processor to the camera, the display, the communications module, the audio module, a sensor, and the like. The GPIO interface may alternatively be configured as an I2C interface, an I2S interface, a UART interface, a MIPI interface, or the like.

The USB interface 130 may be a mini USB interface, a micro USB interface, a USB Type-C interface, or the like. The USB interface may be configured to connect to the charger to charge the terminal 100, or may be configured to transmit data between the terminal 100 and a peripheral device. The USB interface may alternatively be configured to connect to a headset, to play audio by using the headset. The USB interface may alternatively be configured to connect to another electronic device such as an AR device.

An interface connection relationship between the modules shown in this embodiment of the present invention is merely an example for description, and does not constitute a limitation on a structure of the terminal 100. The terminal 100 may use different interface connection manners or a combination of a plurality of interface connection manners in this embodiment of the present invention.

The charging management module 140 is configured to receive charging input from the charger. The charger may be a wireless charger or a wired charger. In some embodiments of wired charging, the charging management module may receive charging input of the wired charger by using the USB interface. In some embodiments of wireless charging, the charging management module may receive wireless charging input by using a wireless charging coil of the terminal 100. When charging the battery 142, the charging management module may further charge the terminal device by using the power management module 141.

The power management module 141 is configured to connect the battery 142 to the charging management module 140 and the processor 110. The power management module receives input of the battery and/or the charging management module, and supplies power to the processor, the internal memory, an external memory, the display, the camera, the communications module, and the like. The power management module may be further configured to monitor parameters such as a battery capacity, a battery cycle count, a state of battery health (an electric leakage or impedance). In some embodiments, the power management module 141 may alternatively be disposed in the processor 110. In some embodiments, the power management module 141 and the charging management module may alternatively be disposed in a same component.

A wireless communication function of the terminal 100 may be implemented by using an antenna module 1, an antenna module 2, the radio frequency module 150, the communications module 160, a modem, the baseband processor, and the like.

The antenna 1 and the antenna 2 are configured to transmit and receive an electromagnetic wave signal. Each antenna in the terminal 100 may be configured to cover one or more communication bands. Different antennas may be further multiplexed, to improve antenna utilization. For example, a cellular network antenna may be multiplexed as a wireless local area network diversity antenna. In some embodiments, the antenna may be used in combination with a tuning switch.

The radio frequency module 150 may provide a communications processing module that is applied to the terminal 100 and that includes a wireless communication solution such as 2G/3G/4G/5G. The radio frequency module 150 may include at least one filter, a switch, a power amplifier, a low noise amplifier (Low Noise Amplifier, LNA), and the like. The radio frequency module 150 may receive an electromagnetic wave by using the antenna 1, perform processing such as filtering or amplification on the received electromagnetic wave, and transfer the electromagnetic wave to the modem for demodulation. The radio frequency module 150 may further amplify a signal modulated by the modem, and convert the signal into an electromagnetic wave for radiation by using the antenna 1. In some embodiments, at least some function modules in the radio frequency module 150 may be disposed in the processor 150. In some embodiments, at least some function modules in the radio frequency module 150 and at least some modules in the processor 110 may be disposed in one component.

The modem may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal by using an audio device (not limited to the speaker, the telephone receiver, or the like), or displays an image or a video by using the display. In some embodiments, the modem may be an independent component. In some other embodiments, the modem may be independent of the processor, and is disposed in a same component as the radio frequency module or another function module.

The communications module 160 may provide a communications processing module that is applied to the terminal 100 and that include a wireless communication solution such as a wireless local area network (wireless local area networks, WLAN), Bluetooth (bluetooth, BT), a global navigation satellite system (global navigation satellite system, GNSS), and frequency modulation (frequency modulation, FM), a near field communication (near field communication, NFC) technology, or an infrared (infrared, IR) technology. The communications module 160 may be one or more components integrating at least one communications processor module. The communications module receives an electromagnetic wave by using the antenna 2, performs frequency modulation and filtering processing on an electromagnetic wave signal, and sends a processed signal to the processor. The communications module 160 may further receive a to-be-sent signal from the processor, perform frequency modulation and amplification on the signal, and convert the signal into an electromagnetic wave for radiation by using the antenna 2.

In some embodiments, the antenna 1 of the terminal 100 is coupled to the radio frequency module, and the antenna 2 is coupled to the communications module. In this way, the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-top satellite system (quasi-zenith satellite system, QZSS)), and/or a satellite-based enhancement system (satellite based augmentation systems, SBAS).

The terminal 100 implements a display function by using the GPU, the display 194, the application processor, and the like. The GPU is a microprocessor for image processing, and is connected to the display and the application processor. The GPU is configured to perform mathematical and geometric calculation, and is configured to render an image. The processor 110 may include one or more GPUs that execute a program instruction to generate or change display information.

The display 194 is configured to display an image, a video, and the like. The display includes a display panel. The display panel may use an LCD (liquid crystal display, liquid crystal display), an OLED (organic light-emitting diode, organic light-emitting diode), an active-matrix organic light emitting diode or an active-matrix organic light emitting diode (active-matrix organic light emitting diode, AMOLED), a miniLED, a microLED, a micro-OLED, a quantum dot light-emitting diode (quantum dot light emitting diodes, QLED), or the like. In some embodiments, the terminal 100 may include one or N displays, where N is a positive integer greater than 1.

Figure 3B:
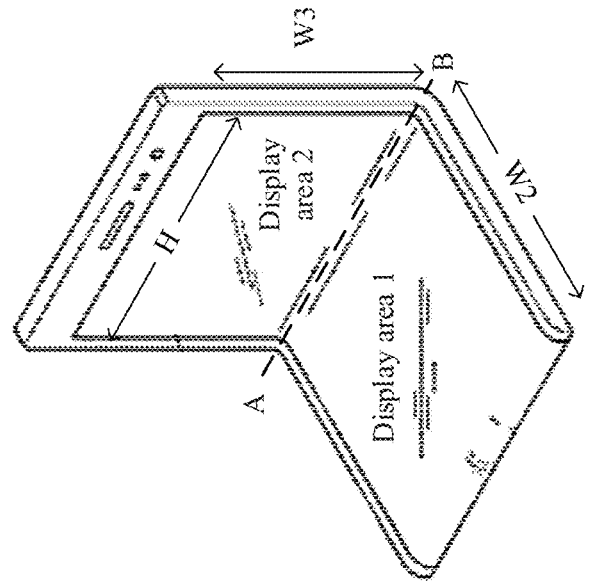
FIG. 3(a) and FIG. 3(b) are a schematic diagram 1 of a flexible display according to an embodiment of this application.
Figure 3A:
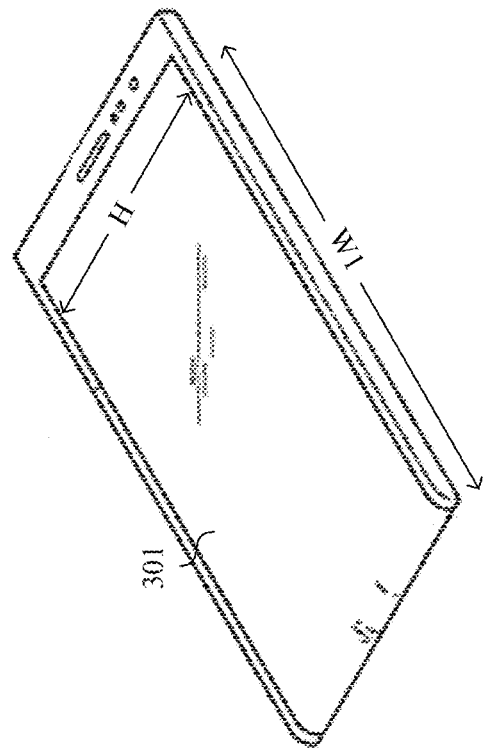

In this embodiment of this application, the display 194 of the terminal 100 may be specifically a flexible display. As shown in FIG. 3(*a*), a flexible display 301 in an unfolded state may be used as a complete display area for displaying. In this case, an aspect ratio Q1 of the display area is: Q1=W1/H. Herein, W1 is a length of a longer side of the flexible display 301, and H is a length of a shorter side of the flexible display 301.

A user may fold the display in any direction or along any folding line in the flexible display 301. As shown in FIG. 3(*b*), after the user folds the flexible display 301 along a folding line AB in the flexible display 301, the flexible display 301 may be divided into two display areas along the folding line AB, that is, a display area 1 and a display area 2. In this embodiment of this application, the display area 1 and the display area 2 that are obtained after folding may be used as two independent display areas for displaying. For example, an application that is running before the flexible display 301 is folded may continue to be displayed in the display area 1, and a desktop or any display screen is simultaneously displayed in the display area 2. Certainly, the display area 2 may display nothing. In this case, an aspect ratio Q2 of the display area 1 is: Q2=W2/H, an aspect ratio Q3 of the display area 2 is: Q3=W3/H, and W2+W3≤W1.

After the user folds the flexible display 301, there is a specific included angle between the display area 1 and the display area 2 obtained through division. For example, as shown in FIG. 4(*a*), the included angle between the display area 1 and the display area 2 may be 0°. To be specific, planes on which the display area 1 and the display area 2 are located are parallel to each other, and the display area 1 and the display area 2 are disposed opposite to each other. For another example, as shown in FIG. 4(*b*), the included angle between the display area 1 and the display area 2 may be 360°. In this case, planes on which the display area 1 and the display area 2 are located are also parallel to each other, but the display area 1 and the display area 2 are disposed away from each other. In this way, the terminal 100 can provide the display function for the user by using each of a front facet, a back facet, and a side.

In this embodiment of this application, in a display process, the terminal 100 may obtain an actual physical state of the flexible display 301 of the terminal 100 in real time, for example, a folded state or an unfolded state. Further, the terminal 100 may create a corresponding window on the flexible display 301 with reference to the actual physical state of the flexible display 301 and a display aspect ratio supported by to-be-displayed content, and display the to-be-displayed content in the window. Therefore, as the physical state of the flexible display 301 changes, the terminal 100 may still display the to-be-displayed content at a proper location on a folded display or an unfolded display, so that the user can obtain relatively good watching and operation experience when the flexible display 301 is folded or unfolded.

Certainly, the display 194 of the terminal 100 may alternatively be a non-flexible display. This is not limited in this embodiment of this application. For example, two non-flexible displays may be connected by using a rotating shaft, to implement relative rotation between the two non-flexible displays, so as to fold the displays. For ease of description, the flexible display is used as an example in all subsequent embodiments to describe a display method provided in the embodiments of this application.

Still as shown in FIG. 2, the terminal 100 may implement the photographing function by using the ISP, the camera 193, the video codec, the GPU, the display, the application processor, and the like.

The ISP is configured to process data fed back by the camera. For example, during photographing, a shutter is open, a ray of light is transmitted to a light-sensitive element of the camera through a lens, an optical signal is converted into an electrical signal, the light-sensitive element of the camera transmits the electrical signal to the ISP for processing, and the electrical signal is converted into an image that can be seen. The ISP may further optimize an algorithm for noise, brightness, and complexion. The ISP may further optimize parameters such as exposure and a color temperature of a photographing scene. In some embodiments, the ISP may be disposed in the camera 193.

The camera 193 is configured to capture a static image or a video. An optical image of an object is generated by using a lens, and is projected to the light-sensitive element. The light-sensitive element may be a charge coupled device (charge coupled device, CCD) or a complementary metal-oxide-semiconductor (complementary metal-oxide-semiconductor, CMOS) photoelectric transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the terminal 100 may include one or N cameras, where N is a positive integer greater than 1.

The digital signal processor is configured to process a digital signal. In addition to a digital image signal, the digital signal processor may further process another digital signal. For example, when the terminal 100 selects a frequency, the digital signal processor is configured to perform Fourier transform on frequency energy, and the like.

The video codec is configured to compress or decompress a digital video. The terminal 100 may support one or more codecs. In this way, the terminal 100 may play or record videos in a plurality of encoding formats, for example, MPEG 1, MPEG 2, MPEG 3, and MPEG 4.

The NPU is a neural-network (neural-network, NN) computing processor that processes input information rapidly by referring to a structure of a biological neural network, for example, by referring to a transmission mode between human brain neurons, and can further perform self-learning continuously. Applications such as intelligent cognition of the terminal 100, such as image recognition, facial recognition, speech recognition, and text understanding, can be implemented by using the NPU.

The external memory interface 120 may be configured to connect to an external storage card such as a micro SD card, to extend a storage capability of the terminal 100. The external storage card communicates with the processor by using the external memory interface, to implement a data storage function, for example, store files such as music and a video into the external storage card.

The internal memory 121 may be configured to store computer executable program code, and the executable program code includes an instruction. The processor 110 runs the instruction stored in the internal memory 121, to implement various function applications and data processing of the terminal 100. The memory 121 may include a program storage area and a data storage area. The program storage area may store an operating system, an application required by at least one function (for example, a voice playing function or an image playing function), and the like. The data storage area may store data (such as audio data and an address book) created during use of the terminal 100, and the like. In addition, the memory 121 may include a high-speed random access memory, and may further include a nonvolatile memory, for example, at least one magnetic disk storage device, a flash storage device, or another volatile solid-state storage device, or a universal flash storage (universal flash storage, UFS).

The terminal 100 may implement an audio function by using the audio module 170, the speaker 170A, the telephone receiver 170B, the microphone 170C, the headset interface 170D, the application processor, and the like, for example, music playing and recording.

The audio module is configured to convert digital audio information into an analog audio signal output, and is configured to convert an analog audio input into a digital audio signal. The audio module may be further configured to encode and decode an audio signal. In some embodiments, the audio module may be disposed in the processor 110, or some function modules in the audio module are disposed in the processor 110.

The speaker 170A, also referred to as a "horn", is configured to convert an audio electrical signal into a sound signal. The terminal 100 may listen to music by using a speaker, or listen to a hands-free call.

The telephone receiver 170B, also referred to as an "earpiece", is configured to convert an audio electrical signal into a sound signal. When a call is answered or voice information is listened to by using the terminal 100, the telephone receiver may be put close to a human ear to listen to a voice.

The microphone 170C, also referred to as a "mike" or a "voice transmitter", is configured to convert a sound signal into an electrical signal. When making a call or sending voice information, the user may make a sound by moving the mouth of the user near the microphone to input a sound signal to the microphone. The terminal 100 may be provided with at least one microphone. In some embodiments, two microphones may be disposed in the terminal 100, to collect a sound signal and further implement a noise reduction function. In some embodiments, alternatively, three, four, or more microphones may be disposed in the terminal 100, to collect a sound signal, reduce noise, and further identify a sound source to implement a directional recording function, and the like.

The headset interface 170D is configured to connect to a wired headset. The headset interface may be a USB interface, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor may be disposed on the display. There are many types of pressure sensors such as a resistive pressure sensor, an inductive pressure sensor, and a capacitive pressure sensor. The capacitive pressure sensor may be a parallel plate including at least two conductive materials. When a force is applied to the pressure sensor, capacitance between electrodes changes. The terminal 100 determines pressure strength based on a capacitance change. When a touch operation is performed on the display, the terminal 100 detects strength of the touch operation by using the pressure sensor. The terminal 100 may also calculate a touch location based on a detection signal of the pressure sensor. In some embodiments, touch operations that are applied to a same touch location but have different touch operation intensity may correspond to different operation instructions. For example, when a touch operation with touch operation intensity less than a first pressure threshold is applied to an SMS message application icon, an instruction for viewing an SMS message is executed. When a touch operation with touch operation intensity greater than or equal to a first pressure threshold is applied to an SMS message application icon, an instruction for creating a new SMS message is executed.

The gyro sensor 180B may be configured to determine a moving posture of the terminal 100. In some embodiments, angular velocities of the terminal 100 around three axes (namely, x, y, and z axes) may be determined by using the gyro sensor. The gyro sensor may be used for image stabilization during photographing. For example, when the shutter is opened, the gyro sensor detects an angle at which the terminal 100 jitters, calculates, based on the angle, a distance for which a lens module needs to compensate, and allows the lens to cancel the jitter of the terminal 100 through reverse motion, to implement image stabilization. The gyro sensor may be further used in navigation and a somatic game scene.

The barometric pressure sensor 180C is configured to measure barometric pressure. In some embodiments, the terminal 100 calculates an altitude by using a barometric pressure value measured by the barometric pressure sensor, to assist positioning and navigation.

The magnetic sensor 180D includes a Hall sensor. The terminal 100 may detect opening and closing of a flip leather case by using a magnetic sensor. In some embodiments, when the terminal 100 is a flip phone, the terminal 100 may detect opening and closing of a flip cover based on the magnetic sensor. Further, based on a detected opening or closing state of the leather case or a detected opening or closing state of the flip cover, a feature such as automatic unlocking when the flip cover is open is set.

The acceleration sensor 180E may detect values of accelerations in various directions (usually on three axes) of the terminal 100. When the terminal 100 is still, a value and a direction of gravity may be detected. The acceleration sensor 180E may be further configured to identify a posture of the terminal, and is applied to an application such as display switching between a landscape mode and a portrait mode and a pedometer).

The distance sensor 180F is configured to measure a distance. The terminal 100 may measure a distance by using an infrared ray or a laser. In some embodiments, in a photographing scene, the terminal 100 may use the distance sensor to measure a distance, to implement fast focusing.

The optical proximity sensor 180G may include, for example, a light emitting diode (LED) and an optical detector such as a photodiode. The light emitting diode may be an infrared light emitting diode. The light emitting diode is used to emit infrared light outward. The photodiode is used to detect infrared reflected light from a nearby object. When sufficient reflected light is detected, it may be determined that there is an object near the terminal 100. When insufficient reflected light is detected, it may be determined that there is no object near the terminal 100. The terminal 100 may detect, by using the optical proximity sensor, that the user holds the terminal 100 close to an ear to make a call, to automatically turn off the display for power saving. The optical proximity sensor may be further used in a smart cover mode or a pocket mode to automatically unlock or lock the display.

The ambient light sensor 180L is configured to sense ambient light brightness. The terminal 100 may adaptively adjust brightness of the display based on the sensed ambient light brightness. The ambient light sensor may be further configured to automatically adjust a w % bite balance during photographing. The ambient light sensor may further cooperate with the optical proximity sensor to detect whether the terminal 100 is in a pocket to prevent a false touch.

The fingerprint sensor 180H is configured to collect a fingerprint. The terminal 100 may use a feature of the collected fingerprint to implement fingerprint unlocking, application access locking, fingerprint photographing, fingerprint call answering, and the like.

The temperature sensor 180J is configured to detect a temperature. In some embodiments, the terminal 100 executes a temperature processing policy based on the temperature detected by the temperature sensor 180ɜ. For example, when the temperature reported by the temperature sensor exceeds a threshold, the terminal 100 lowers performance of a processor located near the temperature sensor, to reduce power consumption to implement thermal protection.

The touch sensor 180K, also referred to as a "touch panel", may be disposed on the display, and is configured to detect a touch operation performed on or near the touch sensor 180K. The touch sensor 180K may transfer the detected touch operation to the application processor, to determine a type of a touch event, and to provide corresponding visual output by using the display.

The bone conduction sensor 180M may collect a vibration signal. In some embodiments, the bone conduction sensor may obtain a vibration signal of a vibration bone of a human vocal part. The bone conduction sensor may further contact a body pulse to receive a blood pressure beating signal. In some embodiments, the bone conduction sensor may be disposed in a headset. The audio module 170 may obtain a voice signal through parsing based on the vibration signal that is of the vibration bone of the vocal part and that is obtained by the bone conduction sensor, to implement a voice function. The application processor may parse heart rate information based on the blood pressure beating signal obtained by the bone conduction sensor, to implement a heart rate detection function.

The key 190 includes a power key, a volume key, and the like. The key 190 may be a mechanical key, or may be a touch key. The terminal 100 receives key input, and generates key signal input related to a user setting and function control of the terminal 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. Different touch operations performed on different areas on the display may correspond to different vibration feedback effects. Different application scenarios (for example, a time reminder, information receiving, an alarm clock, and a game) may also correspond to different vibration feedback effects. Customization of the touch vibration feedback effect may be further supported.

The indicator 192 may be an indicator light, may be configured to indicate a charging state and a power change, and may be configured to indicate a message, a missed call, a notification, and the like.

The SIM card interface 195 is configured to connect to a subscriber identity module (subscriber identity module, SIM). A SIM card may be inserted into the SIM card interface or plugged from the SIM card interface, to implement contact with or separation from the terminal 100. The terminal 100 may support one or N SIM card interfaces, where N is a positive integer greater than 1. The SIM card interface may support a nano SIM card, a micro SIM card, a SIM card, and the like. A plurality of cards may be simultaneously inserted into a same SIM card interface. The plurality of cards may be of a same type or different types. The SIM card interface may be compatible with different types of SIM cards. The SIM card interface may be further compatible with an external storage card. The terminal 100 interacts with a network by using the SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system of the layered architecture is used as an example to illustrate a software structure of the terminal 100.

In a layered architecture, software is divided into several layers, and each layer has a clear role and task. The layers communicate with each other by using an interface. In some embodiments, an Android system is divided into four layers, that is, an application layer, an application framework layer, an Android runtime and a system library, and a kernel layer from top to bottom.

The application layer may include a series of application packages.

As shown in FIG. 5, the application packages may include applications such as Camera, Gallery, Calendar, Calls, Maps, Navigation, WLAN, Bluetooth, Music, Videos, and Messaging.

These applications may be system-level applications (for example, Desktop, Messaging, Calls, Calendar, and Contacts), or may be general-level applications (for example, WeChat and Taobao). The system-level application usually means that the application has system-level permission and can obtain various system resources. The general-level application usually means that the application has general permission and may not be able to obtain some system resources, or the application can obtain some system resources only after being authorized by a user. The system-level application may be an application pre-installed in a mobile phone. The general-level application may be an application pre-installed in the mobile phone, or may be an application subsequently installed by the user.

The application framework layer provides an application programming interface (application programming interface, API) and a programming framework for an application at the application layer. The application framework layer includes some predefined functions.

As shown in FIG. 5, the application framework layer may include an activity manager, a window manager, a content provider, a view system, a resource manager, a notification manager, and the like. This is not limited in this embodiment of this application.

The activity manager (Activity Manager) manages a lifecycle of each application. The application usually runs in an operating system in a form of an activity. For each activity, there is a corresponding application record (ActivityRecord) in the activity manager, and the ActivityRecord records a status of the activity of the application. The activity manager may use the ActivityRecord as an identifier to schedule an activity process of the application.

The window manager (WindowManagerService) is configured to manage a graphical user interface (graphical user interface, GUI) resource used on a display, and may be specifically configured to: obtain a display resolution, create and destroy a window, display and hide a window, arrange a window, manage a focus, manage an input method and wallpaper, and the like.

When an application is run, the activity manager may create a corresponding activity, and the window manager may create a corresponding application window. The window manager periodically refreshes displayed content and a window parameter (for example, a resolution or a location of the application window) of the application window. In addition, the window manager may create a corresponding WindowState for each application window. The window manager uses the WindowState to identify the application window, and uses the WindowState to store, query, and control a status of the application window.

For example, the window manager may query, in a WindowState of a window 1, whether the window 1 is in a full-screen mode. If the window 1 is not in the full-screen mode, the window manager may query, in the WindowState of the window 1, a parameter such as an aspect ratio (16:9 or 4:3) of the window 1.

As shown in FIG. 5, the system library, the kernel layer, and the like below the application framework layer may be referred to as an underlying system. The underlying system includes an underlying display system, configured to provide a display service. For example, the underlying display system includes a display driver at the kernel layer, a surface manager in the system library, and the like. In addition, the underlying system in this application further includes an identification module, configured to identify a physical state change of a flexible display. The identification module may be independently disposed in the underlying display system, or may be disposed in the system library and/or the kernel layer.

In some embodiments (which may be referred to as Manner 1) of this application, the identification module may detect a physical state of the flexible display in real time. When the identification module detects that the physical state of the flexible display changes, for example, that the flexible display is folded by the user or unfolded by the user, the identification module may send this state change to the underlying display system. Alternatively, the underlying display system may periodically obtain the physical state of the current flexible display from the identification module. Further, after determining that the physical state of the flexible display changes, the underlying display system may notify, through system broadcast or the like, the window manager that a system parameter of a current display resolution changes. For example, when the flexible display is unfolded, the underlying display system may notify the window manager that a resolution of the current display changes from 1920×1080 to 3840×2160, that is, a resolution of an effective display area on the current display changes to 3840×2160. Subsequently, when an application at the application layer invokes the window manager to create a corresponding application window, the window manager may set a window parameter such as a resolution or a location of the application window based on an updated display resolution, so that an enabled application can adapt to the flexible display in different physical states.

Figure 6:
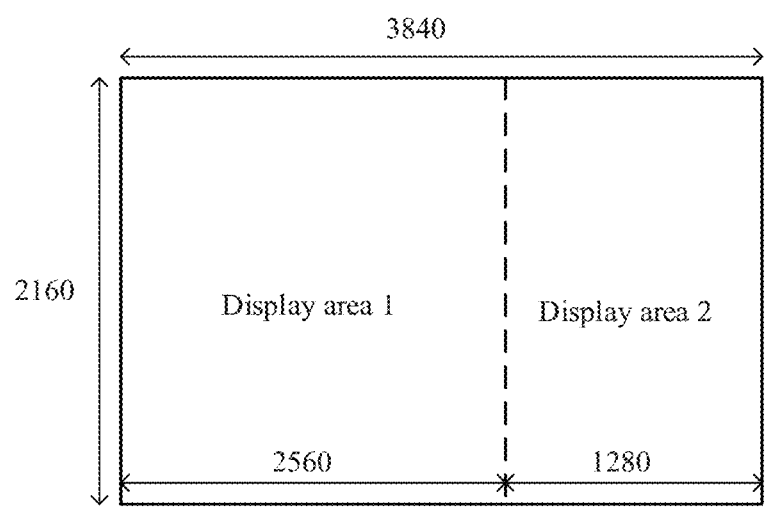
FIG. 6 is a schematic diagram 3 of a flexible display according to an embodiment of this application.

In some other embodiments (which may be referred to as Manner 2) of this application, the system parameter of the display resolution reported by the underlying display system to the window manager is always a resolution of the flexible display in an unfolded state, that is, a maximum state of the flexible display. However, the window manager may obtain a specific physical state of the current flexible display from the identification module by invoking a corresponding interface, through system broadcast, or the like. In this way, the window manager may determine a currently available effective display area on the entire flexible display based on the specific physical state of the flexible display. For example, as shown in FIG. 6, the display resolution reported by the underlying display system is a resolution obtained when the flexible display is unfolded: 3840×2160, and the window manager learns, from the identification module, that the current flexible display is in a folded state, a resolution of a display area 1 that has a larger area after the flexible display is folded is 2560×2160, and a resolution of a display area 2 that has a smaller area after the flexible display is folded is 1280×2160. In this case, the window manager may determine, as the effective display area, the display area 1 that has the larger area on the entire flexible display. Subsequently, when an application at the application layer invokes the window manager to create a corresponding application window, the window manager may set a window parameter such as a resolution or a location of the application window in the effective display area, so that the enabled application can adapt to the flexible display in different physical states.

In Manner 1, the system parameter of the display resolution obtained by the window manager from the underlying display system changes with the physical state of the display. In this case, if the display resolution obtained by the window manager changes, the activity manager needs to end a running application, so that display content can be re-arranged based on the changed display resolution, to adapt to the flexible display whose display resolution changes. However, in Manner 2, the system parameter of the display resolution obtained by the window manager from the underlying display system is unchanged, and the window manager may determine the effective display area on the entire display by interacting with the identification module. In this case, even if a resolution and a location of the effective display area determined by the window manager change, the system parameter of the display resolution does not change. Therefore, the activity manager does not need to end a running application, and the activity manager can adapt to the flexible display in different physical states by arranging corresponding display content in different effective display areas.

In addition, in this embodiment of this application, the display resolution or a length of the display in a direction is defined by using a pixel as a unit. It may be understood that a person skilled in the art may further define, by using another unit (for example, millimeter or centimeter), the display resolution or the length of the display in a direction. This is not limited in this embodiment of this application.

The content provider is configured to: store and obtain data, and make the data accessible to an application. The data may include a video, an image, an audio, calls that are made and received, a browsing history and a bookmark, an address book, and the like. The view system includes visual controls such as a control for displaying a text and a control for display an image. The view system may be configured to construct an application. The display interface may include one or more views. For example, a display interface including an SMS message notification icon may include a text display view and an image display view. The resource manager provides various resources such as a localized character string, an icon, an image, a layout file, and a video file for an application. The notification manager enables an application to display notification information in a status bar, and may be used to convey a notification-type message. The notification-type message may automatically disappear after a short pause without user interaction. For example, the notification manager is configured to notify download completing, a message prompt, and the like. The notification manager may be a notification that appears on a top status bar of the system in a form of a graph or a scroll bar text, for example, a notification of an application running on the background, or may be a notification that appears on the display in a form of a dialog window. For example, text information is prompted in the status bar, a prompt tone is produced, the terminal vibrates, or the indicator light blinks.

As shown in FIG. 5, the Android runtime includes a kernel library and a virtual machine. The Android runtime is responsible for scheduling and management of the Android system. The kernel library includes two parts: one part is a function that needs to be called by a java language, and the other part is a kernel library of Android. The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

As shown in FIG. 5, the system library may include a plurality of function modules, for example, a surface manager, a media library (Media Libraries), OpenGL ES, and SGL.

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video encoding formats, for example, MPEG 4, H.264, MP3, AAC, AMR, JPG, and PNG.

OpenGL ES is configured to implement three-dimensional graphics drawing, image rendering, composition, layer processing, and the like.

The SGL is a 2D drawing engine.

As shown in FIG. 5, the kernel layer is a layer between hardware and software. The kernel layer includes at least a display driver, a camera driver, an audio driver, and a sensor driver.

For ease of understanding, the following specifically describes, with reference to the accompanying drawings, a display method for a flexible display provided in an embodiment of this application. In the following embodiments, that a mobile phone is used as a terminal is used as an example for description.

Figure 7:
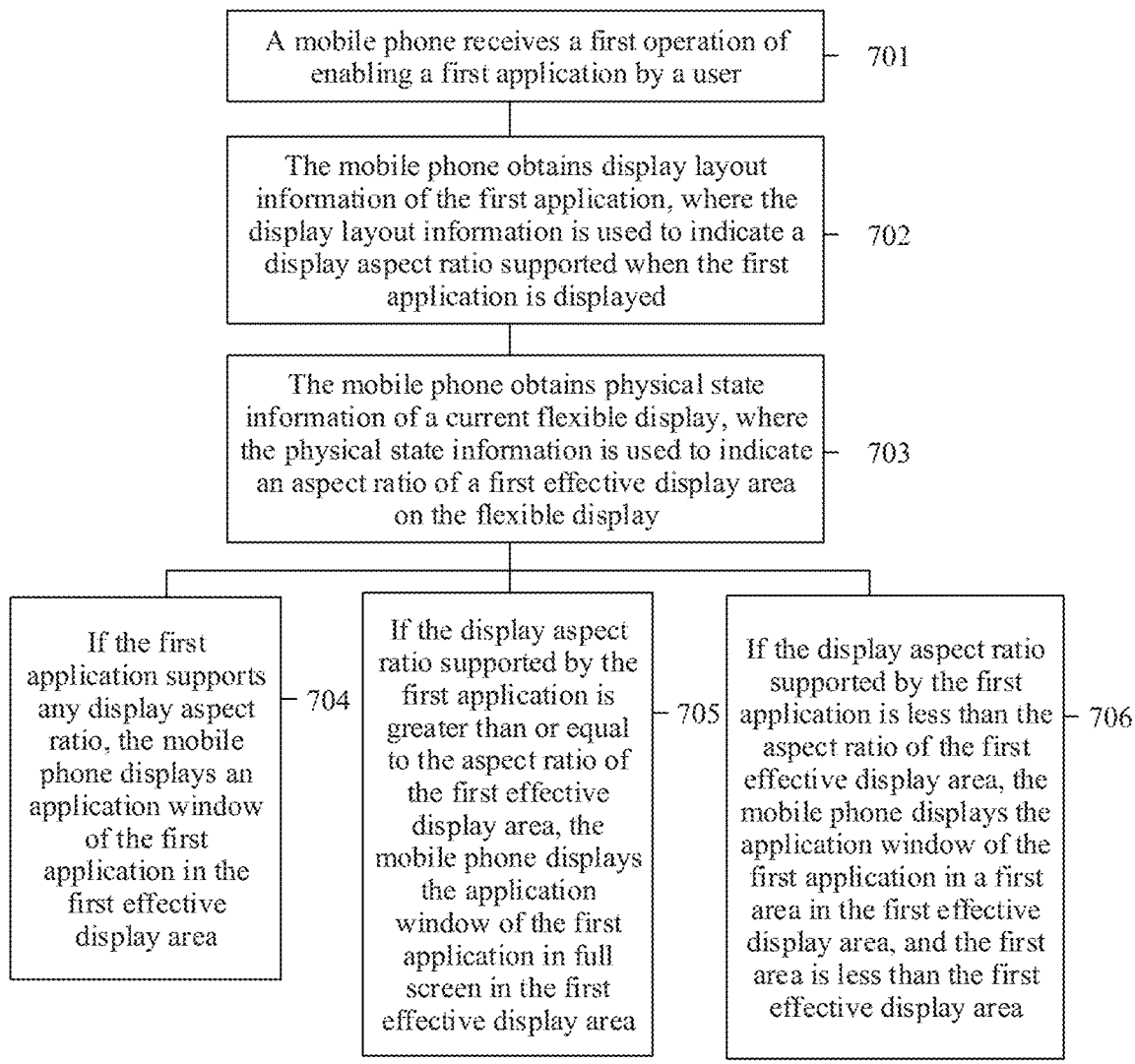
FIG. 7 is a schematic flowchart 1 of a display method for a flexible display according to an embodiment of this application.

FIG. 7 is a schematic flowchart of a display method for a flexible display according to an embodiment of this application. As shown in FIG. 7, the display method for a flexible display may include the following steps.

S701. A mobile phone receives a first operation of enabling a first application by a user.

Figure 8:
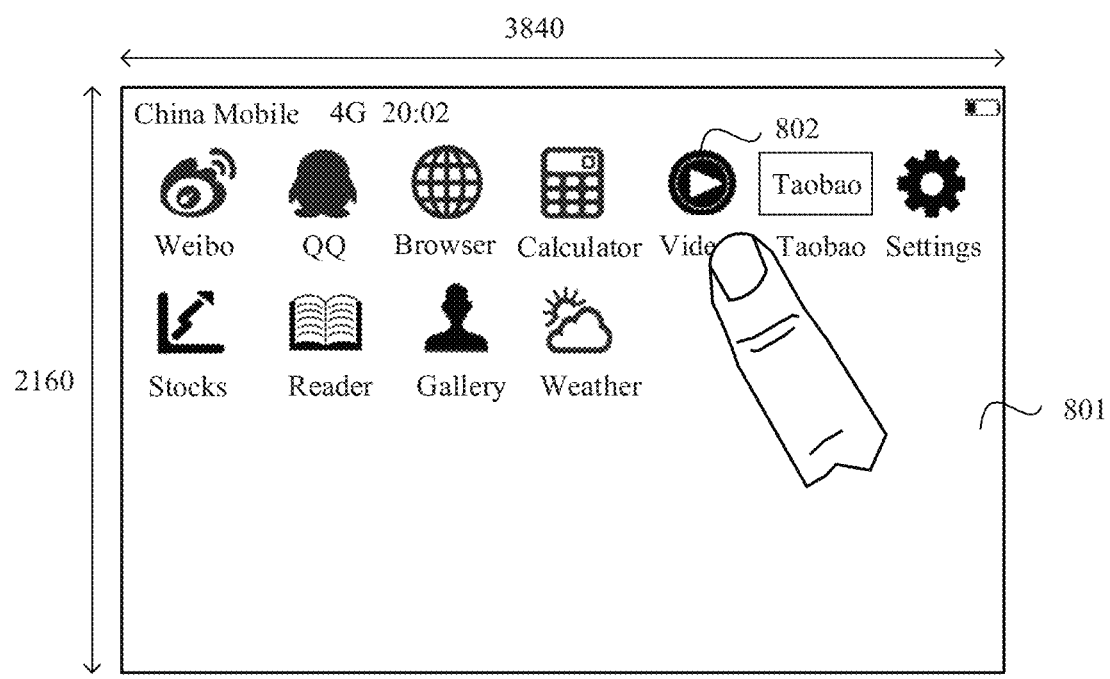
FIG. 8 is a schematic diagram 1 of a scenario of a display method for a flexible display according to an embodiment of this application.

The first application may be any application installed in the mobile phone. The user may perform the first operation of enabling the first application from a desktop, a HiBoard menu, a pull-up menu, a drop-down menu, or any shortcut menu. As shown in FIG. 8, the user may tap an icon 802 of a video APP on a desktop 801, to open the video APP. In this case, the flexible display may be in an unfolded state, or may be in a folded state. This is not limited in this embodiment of this application.

In addition, the first application may alternatively be a system-level application such as Desktop or Settings. Desktop is used as an example. When it is detected that the user performs an operation of returning to a home screen or performs an operation such as unlocking, the mobile phone may determine that the user performs a first operation of enabling the desktop, and subsequently, the mobile phone may continue to perform the following steps S702 to S706 to display the desktop on the flexible display.

S702. The mobile phone obtains display layout information of the first application, where the display layout information is used to indicate a display aspect ratio supported when the first application is displayed.

The display aspect ratio may be an aspect ratio of an application window created for the first application when the mobile phone displays the first application. Usually, the aspect ratio of the application window is a ratio of a longer side to a shorter side of the application window. Currently, a commonly used display aspect ratio of an application includes 16:9, 4:3, or the like. The display aspect ratio indicated in the display layout information of the first application is usually a maximum display aspect ratio supported by the first application.

Different mobile phones may have different display resolutions. Therefore, when designing an application, a developer designs, for the application, display layout resources used when the application is displayed at different display aspect ratios, for example, a corresponding first display layout resource used when the display aspect ratio is 4:3, and a corresponding second display layout resource used when the display aspect ratio is 16:9. Usually, the display layout resource includes each display element in a display picture, and parameters such as a size and a location of each display element. In addition, when designing an application, the developer may further design the application to be capable of adaptive display at any display aspect ratio. In this case, when the application is displayed on a display at any display aspect ratio, an appropriate display layout resource can be adaptively arranged.

The first application is used as an example. The developer may declare, in the display layout information of the first application, related information such as the display aspect ratio that can be supported when the first application is displayed. For example, the maximum display aspect ratio that is supported by the first application and that is included in the display layout information of the first application is 16:9. In other words, an aspect ratio of an application window subsequently created by the mobile phone for the first application may be any value less than or equal to 16:9. For another example, the display layout information of the first application may specify that the first application can support any display aspect ratio. For another example, the display layout information of the first application may be empty, that is, the developer does not explicitly declare a display aspect ratio that can be supported when the first application is displayed.

When the user installs the first application, the display layout information of the first application is usually used as application data and is stored in the mobile phone, for example, stored in a manifest function. In this case, when the mobile phone enables the first application, the window manager may invoke a corresponding interface, to obtain the display layout information of the first application.

S703. The mobile phone obtains physical state information of a current flexible display, where the physical state information is used to indicate an aspect ratio of a first effective display area on the flexible display.

The window manager may obtain the physical state information of the current flexible display through system broadcast or by invoking a corresponding interface. For example, the window manager may obtain a system parameter of a display resolution from the underlying display system shown in FIG. 5, and further determine a physical state of the current flexible display based on the display resolution. For another example, the window manager may alternatively obtain the physical state information of the current flexible display from the identification module shown in FIG. 5. This is not limited in this embodiment of this application.

The physical state information may specifically include the physical state of the flexible display, for example, the folded state or the unfolded state. If the flexible display has a plurality of folded states, the physical state information may further include a specific folded state of the flexible display, for example, a folded state 1 or a folded state 2. In addition, the physical state information may further include a specific resolution of a display area on the flexible display in a current physical state. For example, in the folded state, a resolution of a display area 1 is 2500×2160, and a resolution of a display area 2 is 1340×2160.

For example, if only one fixed folding line is disposed on the flexible display of the mobile phone, after the user folds the flexible display along the folding line, resolutions and locations of two obtained display areas are fixed. In this case, the underlying display system or the identification module may set the physical state information of the current flexible display to 0 or 1. Herein, 0 indicates that the flexible display is in the unfolded state in this case, and 1 indicates that the flexible display is in the folded state in this case. In this case, when the physical state information obtained by the window manager is 0, the entire flexible display (for example, a resolution is 3840×2160) may be used as the first effective display area. In this case, the aspect ratio of the first effective display area is 3840:2160 (namely, 16:9). Correspondingly, if the physical state information obtained by the window manager is 1, the window manager may use, as the first effective display area, one display area, for example, a larger display area whose resolution is 2560×2160, in the two display areas obtained through folding. In this case, the aspect ratio of the first effective display area is 2560:2160 (namely, 32:27).

Alternatively, if the folding line on the flexible display is not fixed, after the user folds the flexible display along a folding line, the underlying display system or the identification module may identify that the flexible display is in the folded state, and report, to the window manager, the physical state information including specific resolutions of two display areas obtained through division after the flexible display is folded. For example, the physical state information obtained by the window manager includes the folded state, and in the folded state, the resolution of the display area 1 is 2500×2160, and the resolution of the display area 2 is 1340×2160. In this case, the window manager may select one of the display area 1 and the display area 2 as the first effective display area. After the first effective display area is determined, the aspect ratio of the first effective display area is determined accordingly.

The flexible display in the unfolded state in FIG. 8 is still used as an example. After obtaining the physical state information of the current flexible display, the mobile phone may determine, from the physical state information, that the entire flexible display is the first effective display area in this case, and the aspect ratio of the first effective display area is 3840:2160. In this case, the mobile phone may further determine, by comparing the aspect ratio of the first effective display area with the display aspect ratio supported in the display layout information of the first application, a window parameter such as a location or a resolution of the application window created for the first application.

In addition, the mobile phone may further adjust a resolution of the first effective display area based on the determined aspect ratio of the first effective display area. For example, as shown in FIG. 8, after the mobile phone determines the entire flexible display in the unfolded state as the first effective display area, the mobile phone may learn, through calculation, that the aspect ratio of the first effective display area is 3840:2160 (namely, 16:9). If the aspect ratio of the first effective display area is greater than a preset value (for example, 1.6), it indicates that the first effective display area is excessively wide or high. In this case, the mobile phone may reduce the first effective display area to an area that the user can operate with one hand, or reduce the aspect ratio of the first effective display area to an aspect ratio that matches a visual viewing effect of human eyes. For example, the mobile phone may reduce the first effective display area to an area whose resolution is 2000×1800 in a lower right corner on the display in FIG. 8. In other words, the adjusted first effective display area is the area whose resolution is 2000×1800 in the lower right corner on the display. In this way, subsequently, the mobile phone displays the application window of the first application in the adjusted first effective display area, to facilitate user operations with one hand.

The user usually has a relatively strong requirement for one-hand operations when the flexible display is in the folded state. Therefore, the mobile phone may adjust the resolution of the first effective display area according to the foregoing method when determining that the flexible display is in the folded state, to improve operation efficiency and watching experience of the user on the folded display.

S704. If the first application supports any display aspect ratio, the mobile phone displays the application window of the first application in the first effective display area.

That the user enables the video APP is still used as an example. After the mobile phone receives the first operation of enabling the video APP by the user, the video APP may request the window manager to create a corresponding application window for the video APP. In this case, the window manager may invoke a corresponding interface to obtain display layout information of the video APP. If the display layout information of the video APP declares that the video APP can be displayed at any display aspect ratio, it indicates that an appropriate display layout resource of the video APP can be determined for displaying regardless of an actual physical state of the flexible display in the current mobile phone. In this case, the window manager may create an application window at any location in the first effective area determined in step S703, to enable and display content in the video APP.

Figure 9A:
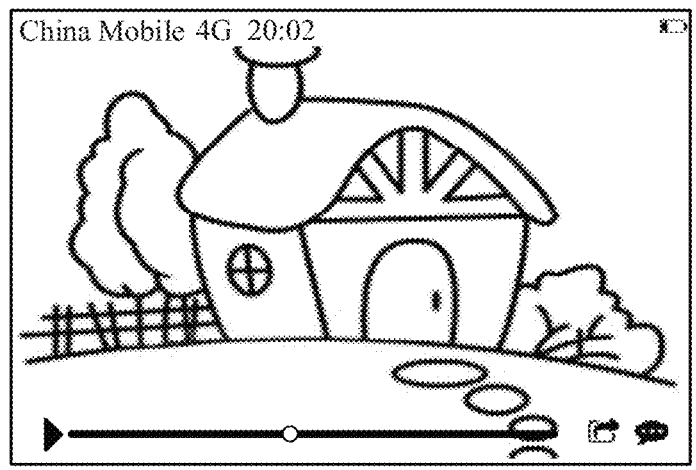
FIG. 9(a) to FIG. 9(c) are a schematic diagram 2 of a scenario of a display method for a flexible display according to an embodiment of this application.
Figure 9B:
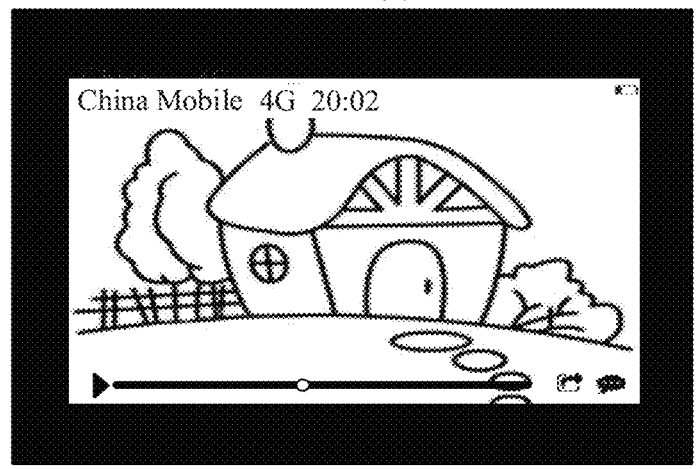
Figure 9C:
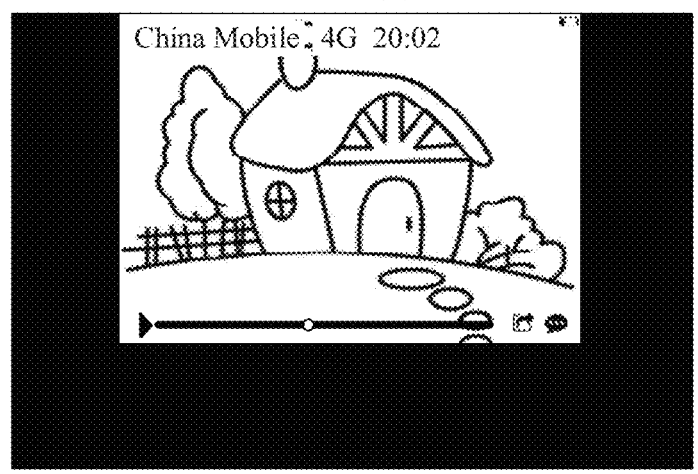

For example, as shown in FIG. 9(*a*), the window manager may create a full-screen application window to display content in the video APP, so that the user can obtain immersive watching experience. Alternatively, as shown in FIG. 9(*b*) and FIG. 9(*c*), the window manager creates an application window on the entire flexible display based on a specific aspect ratio (for example, 16:9 or 4:3), to display the content in the video APP. This is not limited in this embodiment of this application.

In addition, if a display aspect ratio (for example, 16:9 or 4:3) that can be supported by the video APP is explicitly specified in the display layout information of the video APP (the first application), the mobile phone may continue to perform step S705 or S706. When the display aspect ratio supported by the first application is greater than or equal to the aspect ratio of the first effective display area, the mobile phone may perform step S705; or when the display aspect ratio supported by the first application is less than the aspect ratio of the first effective display area, the mobile phone may perform step S706.

S705. If the display aspect ratio supported by the first application is greater than or equal to the aspect ratio of the first effective display area, the mobile phone displays the application window of the first application in full screen in the first effective display area.

Figure 10:
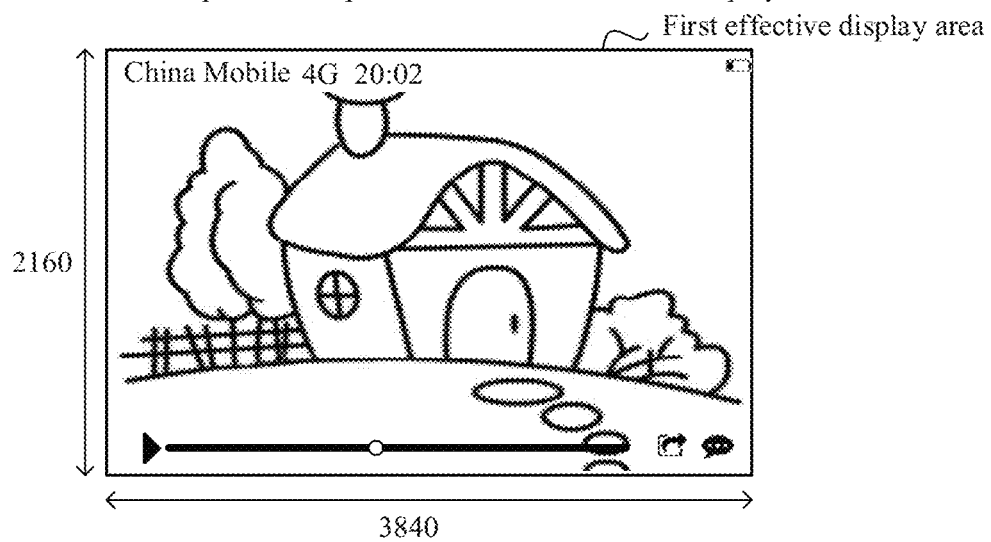
FIG. 10 is a schematic diagram 3 of a scenario of a display method for a flexible display according to an embodiment of this application.

If the display aspect ratio supported by the first application is greater than or equal to the aspect ratio of the first effective display area, it indicates that a display layout resource of the first application can adapt to the entire first effective display area. For example, if a maximum display aspect ratio supported by the video APP is 16:9, and an aspect ratio of a currently unfolded flexible display is also 16:9, as shown in FIG. 10, the window manager may use a resolution of the entire flexible display (that is, the first effective display area) as a resolution of the application window of the video APP, and then create the application window of the video APP based on the resolution. In this case, the application window of the video APP may be displayed in full screen in the first effective display area. For another example, if the maximum display aspect ratio supported by the video APP is 17:9, it indicates that an aspect ratio of the application window of the video APP may be any value less than or equal to 17:9. Therefore, the mobile phone may create, in the first effective display area whose aspect ratio is 16:9, an application window whose aspect ratio is 16:9, to display the video APP in full screen.

S706. If the display aspect ratio supported by the first application is less than the aspect ratio of the first effective display area, the mobile phone displays the application window of the first application in a first area in the first effective display area, and the first area is less than the first effective display area.

If the display aspect ratio supported by the first application is less than the aspect ratio of the first effective display area, it indicates that the display layout resource of the first application cannot completely fill the entire first effective display area. In this case, if the mobile phone forcibly displays the application window of the first application in full screen in the first effective display area, an error may occur when the window manager arranges the display layout resource of the first application, and the first application cannot be normally enabled. To avoid this case, the mobile phone may create, in the first effective display area, an application window that matches the display aspect ratio supported by the first application.

Figure 11A:
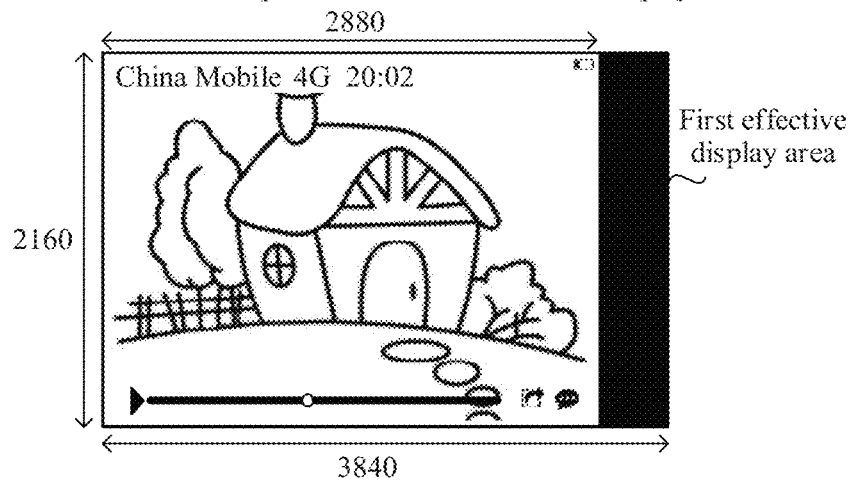
FIG. 11(a) to FIG. 11(c) are a schematic diagram 4 of a scenario of a display method for a flexible display according to an embodiment of this application.
Figure 11B:
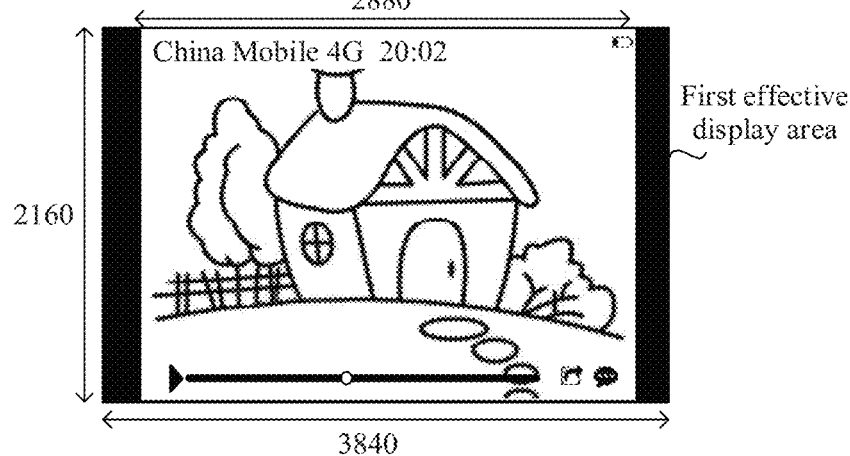

For example, the aspect ratio of the first effective display area on the current flexible display is 16:9, and the maximum display aspect ratio supported by the video APP is 4:3. In this case, the display aspect ratio supported by the video APP is less than the aspect ratio of the first effective display area. In this case, the mobile phone may create an application window in the first effective display area based on the maximum display aspect ratio 4:3 supported by the video APP, for example, create, in the first effective display area, a largest application window whose display aspect ratio is 4:3. As shown in FIG. 11(*a*) to FIG. 11(*c*), the mobile phone may use a shorter side of the first effective display area as a shorter side of the application window, that is, a length of the shorter side of the application window is 2160. After determining the length of the shorter side of the application window, the mobile phone may determine, based on the ratio of 4:3, that a length of the longer side of the application window is 2880. Therefore, a resolution of the application window of the first application is 2880×2160.

Figure 11C:
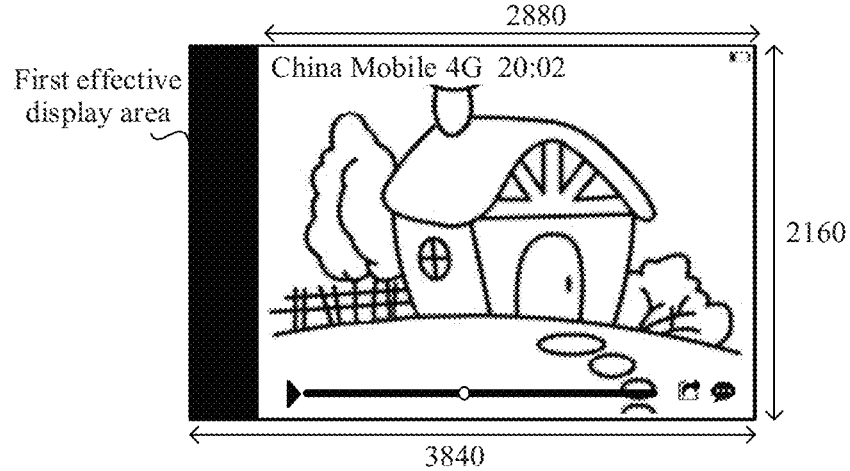

When determining a location of the application window of the first application, the window manager may set the location of the application window of the first application to be on a left side of the first effective display area. In this case, as shown in FIG. 11(*a*), the first area in which the application window of the first application is located is an area whose resolution is 2880×2160 on the left of the first effective display area. Alternatively, the location of the application window of the first application may be in the center of the first effective display area. In this case, as shown in FIG. 11(*b*), the first area in which the application window of the first application is located is an area whose resolution is 2880×2160 in the center of the first effective display area. Alternatively, the location of the application window of the first application may be on a right side of the first effective display area. In this case, as shown in FIG. 11(c), the first area in which the application window of the first application is located is an area whose resolution is 2880×2160 on the right side of the first effective display area.

Certainly, the mobile phone may alternatively create the application window of the first application in an effective display area based on any ratio less than 4:3. In this case, all display layout resources of the first application may support a created application window. This is not limited in this embodiment of this application.

It should be noted that, when the display aspect ratio supported by the first application is less than the aspect ratio of the first effective display area, the application window created by the mobile phone in step S706 is located in the first area in the first effective display area. In other words, the application window of the first application does not completely fill the first effective display area. In this case, the mobile phone may be further provided with one or more shortcut keys in a second area in the first effective display area other than the first area.

Figure 12:
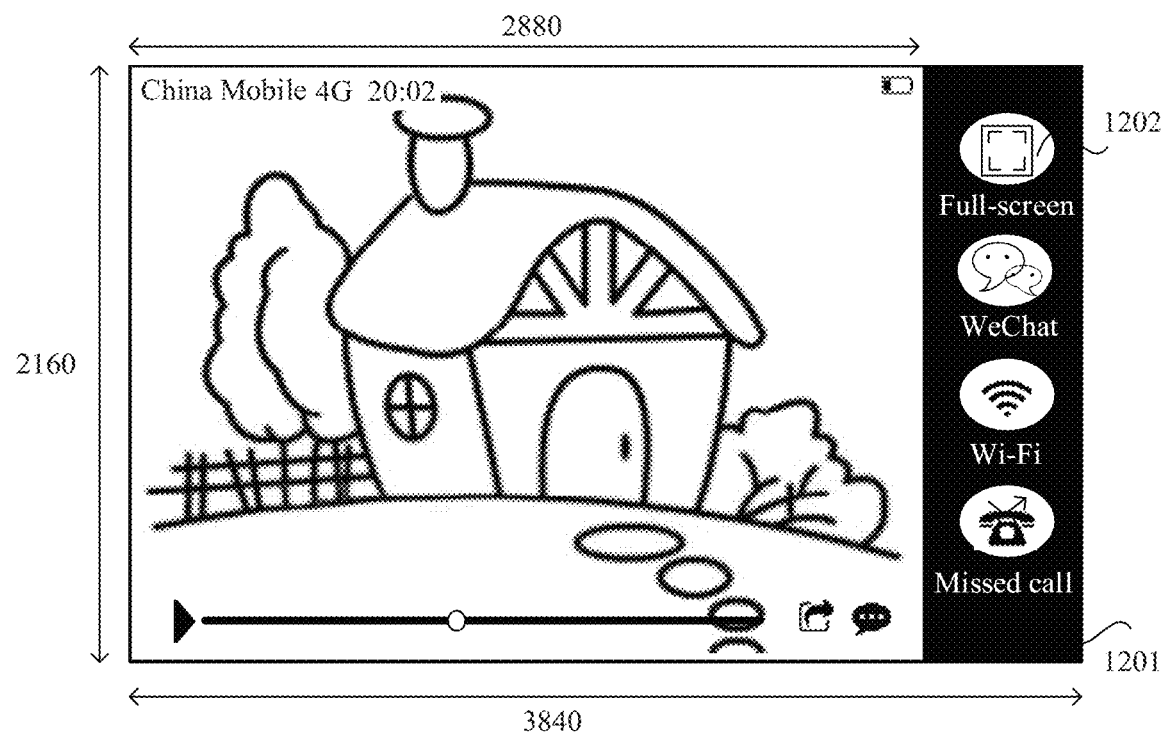
FIG. 12 is a schematic diagram 5 of a scenario of a display method for a flexible display according to an embodiment of this application.

For example, as shown in FIG. 12, a second area 1201 is an area on two sides of the first area in the first effective display area. The mobile phone may be provided with a full-screen key 1202 in the second area 1201. If detecting that the user taps the full-screen key 1202, the mobile phone may display the application window of the first application in full screen in the first effective display area. For example, the mobile phone may forcibly display, in full screen in the first effective display area whose aspect ratio is 16:9, a display layout resource that is of the first application and that corresponds to the display aspect ratio 4:3. Alternatively, the mobile phone may stretch, in a width direction of the first effective display area, a display layout that is of the first application and whose display aspect ratio is 4:3, to achieve a full-screen display effect.

In addition, the mobile phone may set that a current operation of tapping the full-screen key 1202 by the user takes effect only in a running process of the first application, or may set that a current operation of tapping the full-screen key 1202 by the user takes effect in all subsequent display scenarios in which the display aspect ratio of the first application is less than the aspect ratio of the first effective display area, or may set that a current operation of tapping the full-screen key 1202 by the user takes effect in all display scenarios in which a display aspect ratio of an application is less than the aspect ratio of the first effective display area. This is not limited in this embodiment of this application.

Certainly, the shortcut key may alternatively be an icon of another application or function, for example, an icon of an unread message, an icon of a recently used application, or an icon of a Wi-Fi function. This is not limited in this embodiment of this application. The user can use the shortcut keys to quickly enable corresponding shortcut functions.

In addition, if the display aspect ratio supported by the first application is not specified in the display layout information of the first application, the mobile phone may create and display the application window of the first application in the first effective display area on the flexible display based on a default ratio (for example, 4:3) in the system.

In some other embodiments of this application, a display aspect ratio that can be supported by an application and that is specified in display layout information of the application may be inconsistent with a display aspect ratio that can be actually supported by the application. For example, when designing the first application, the developer designs the first application to be capable of adaptive display at any display aspect ratio, but the developer declares, in the display layout information of the first application, that the maximum display aspect ratio that can be supported by the first application is 16:9. In this case, if the mobile phone determines, based on the physical state information of the flexible display, that the aspect ratio of the first effective display area on the current flexible display is 17:9, the mobile phone creates, for the first application according to the method in step S705 in the first effective display area whose aspect ratio is 17:9, an application window whose display aspect ratio is equal to or less than 16:9. It can be learned that the first application can be displayed in full screen in the first effective display area, but the application window actually created by the mobile phone for the first application does not fill the entire first effective display area.

In this case, an application configuration list may be prestored in the mobile phone, and the application configuration list includes at least one application and a maximum display aspect ratio actually supported by the application, for example, an adaptive ratio or 2.35:1. A maximum display aspect ratio supported by each application in the application configuration list may be determined by a person skilled in the art through a test, or the like, or may be determined based on feedback data when the user uses an application. The maximum display aspect ratio supported by each application in the application configuration list may alternatively be periodically obtained from a server and updated.

Therefore, after the mobile phone receives the first operation of enabling the first application by the user, the window manager may query whether the first application is in the application configuration list. If the first application is in the application configuration list, the mobile phone may skip step S702, and continue to perform S703 to S706. In this case, the window manager may create, in the first effective display area, a corresponding application window for the first application based on the maximum display aspect ratio that is actually supported by the first application and that is recorded in the application configuration list. If the first application is not in the application configuration list, the mobile phone may continue to perform steps S702 to S706, to determine the window parameter such as the location or the resolution of the application window of the first application by obtaining the display layout information of the first application.

In this case, by performing steps S701 to S706, the mobile phone may determine, based on a specific physical state (for example, the folded state or the unfolded state) of the current flexible display, the first effective display area that can be used for display on the current flexible display, and further, create a corresponding application window in the first effective display area with reference to a display aspect ratio supported by an application in display layout information of the application, and display content of the application in the application window. In this way, regardless of a change of a physical state of a flexible display, a terminal may open and display an application window of an application in a proper location on a folded display or an unfolded display, so that the user can obtain relatively good watching and operation experience when the flexible display is folded or unfolded.

Figure 13:
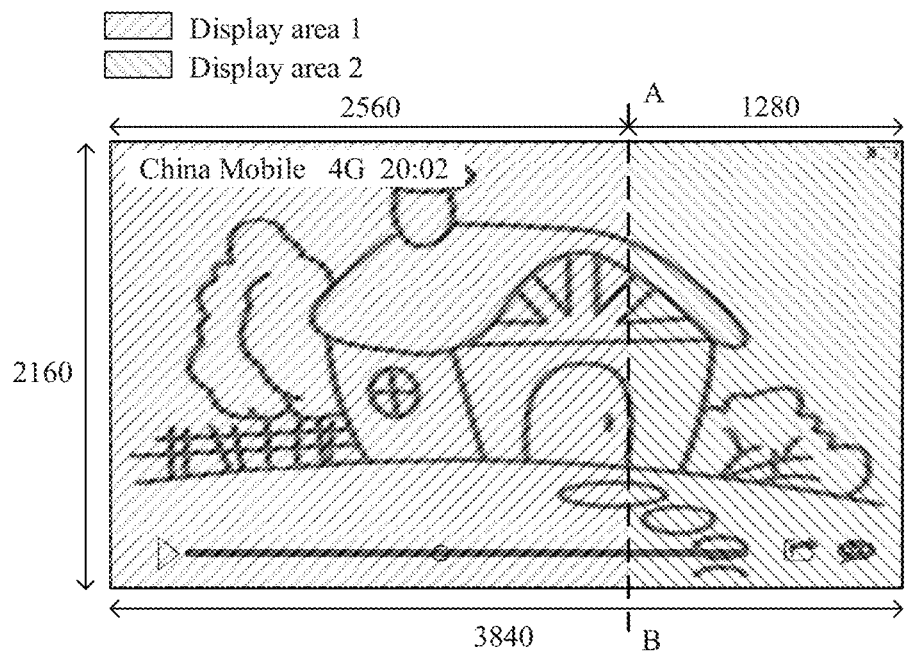
FIG. 13 is a schematic diagram 6 of a scenario of a display method for a flexible display according to an embodiment of this application.

After the mobile phone displays the application window of the first application in the first effective display area on the flexible display, the physical state of the flexible display may still change. As shown in FIG. 13, when the flexible display is in the unfolded state, the mobile phone may display the application window of the video APP in full screen by performing steps S701 to S705. In this case, if the user folds the flexible display along a folding line AB, the mobile phone may adjust the application window of the video APP based on a physical state of the folded flexible display.

Figure 14:
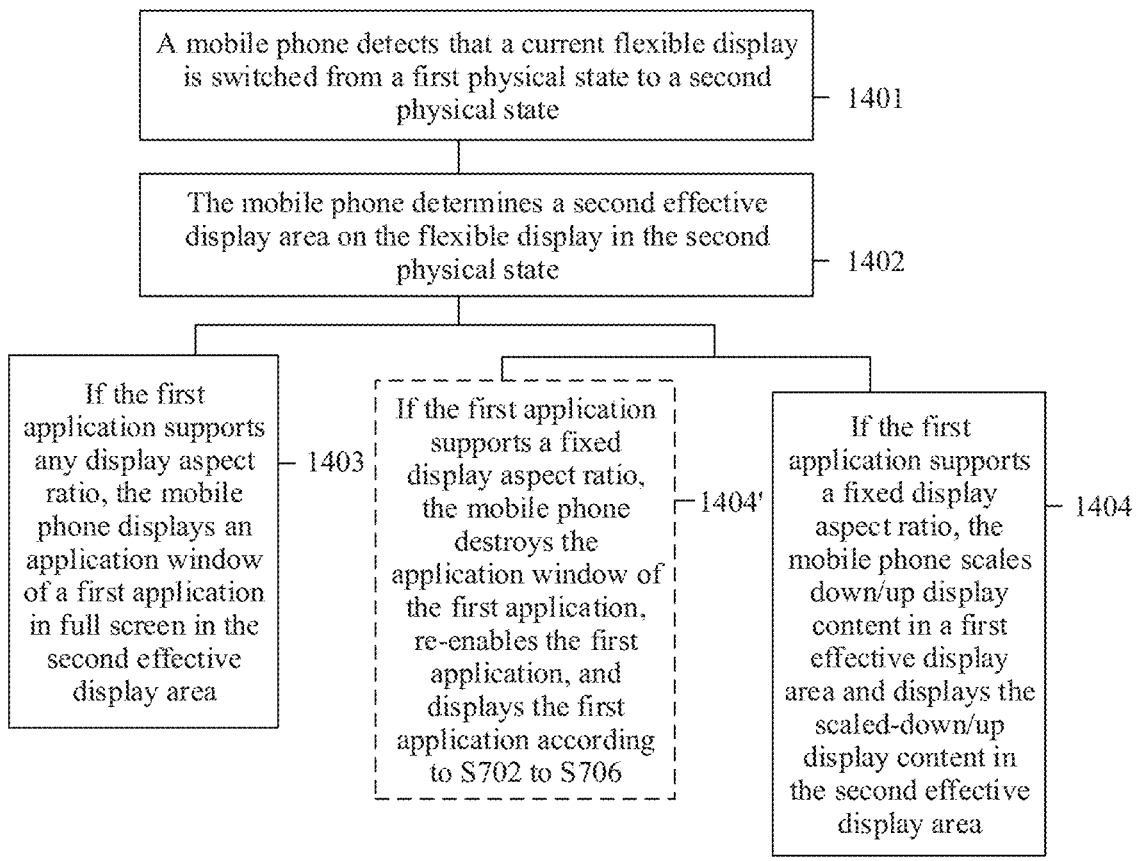
FIG. 14 is a schematic flowchart 2 of a display method for a flexible display according to an embodiment of this application.

In this case, an embodiment of this application provides a display method for a flexible display. As shown in FIG. 14, the display method for a flexible display may include the following steps.

S1401. A mobile phone detects that a current flexible display is switched from a first physical state to a second physical state.

Specifically, a window manager may periodically obtain physical state information of the current flexible display through system broadcast or by invoking a corresponding interface. If physical state information obtained last time is different from currently obtained physical state information, for example, physical state information 1 obtained last time is 0 (that is, the flexible display is in an unfolded state), and currently obtained physical state information 2 is 1 (the flexible display is in a folded state), it indicates that a physical state of the current flexible display changes. Alternatively, if the physical state information obtained last time indicates that the flexible display is in a folded state 1, and the currently obtained physical state information indicates that the flexible display is in a folded state 2, it may also indicate that the physical state of the flexible display changes.

In some embodiments of this application, if two display resolutions consecutively obtained by the window manager from an underlying display system are different, the mobile phone may determine that the current flexible display is switched from the first physical state to the second physical state. The parameter of the display resolution is a system-level parameter. Therefore, when the display resolution changes, the mobile phone needs to end a running first application, and then recreates an application window of the first application based on a new display resolution according to the method in steps S702 to S706.

In some embodiments of this application, each display resolution obtained by the window manager from the underlying display system may keep unchanged, but if physical state information obtained by the window manager from the identification module changes, the mobile phone may determine that the current flexible display is switched from the first physical state to the second physical state. In this case, because the system-level parameter of the display resolution does not change, the mobile phone does not need to end the running first application, and may continue to display the application window of the first application on the flexible display in the second physical state by performing steps S1402 to S1404.

S1402. The mobile phone determines a second effective display area on the flexible display in the second physical state.

If a folding line on the flexible display is fixed, after the window manager determines that the current flexible display is in the second physical state, if the second physical state is the unfolded state, the window manager may determine the entire flexible display as the second effective display area; or if the second physical state is the folded state, locations and resolutions of two display areas obtained through division performed after folding are also fixed, and the window manager may determine, as the second effective display area, a display area that has a larger area or that is closer to a user.

If the folding line on the flexible display is not fixed, the physical state information obtained by the window manager includes information such as a resolution of one or more display areas. Similarly, the window manager may determine, as the second effective display area, the display area that has a larger area or that is closer to the user.

For example, still as shown in FIG. 13, after the user folds the flexible display along a folding line AB, the flexible display is divided into a display area 1 and a display area 2. A resolution of the display area 1 is 2560×2160, and a resolution of the display area 2 is 1280×2160. In this case, the mobile phone may determine, based on recently obtained physical state information, the display area 1 with a larger area as the second effective display area.

S1403. If the first application supports any display aspect ratio, the mobile phone displays the application window of the first application in full screen in the second effective display area.

Figure 15:
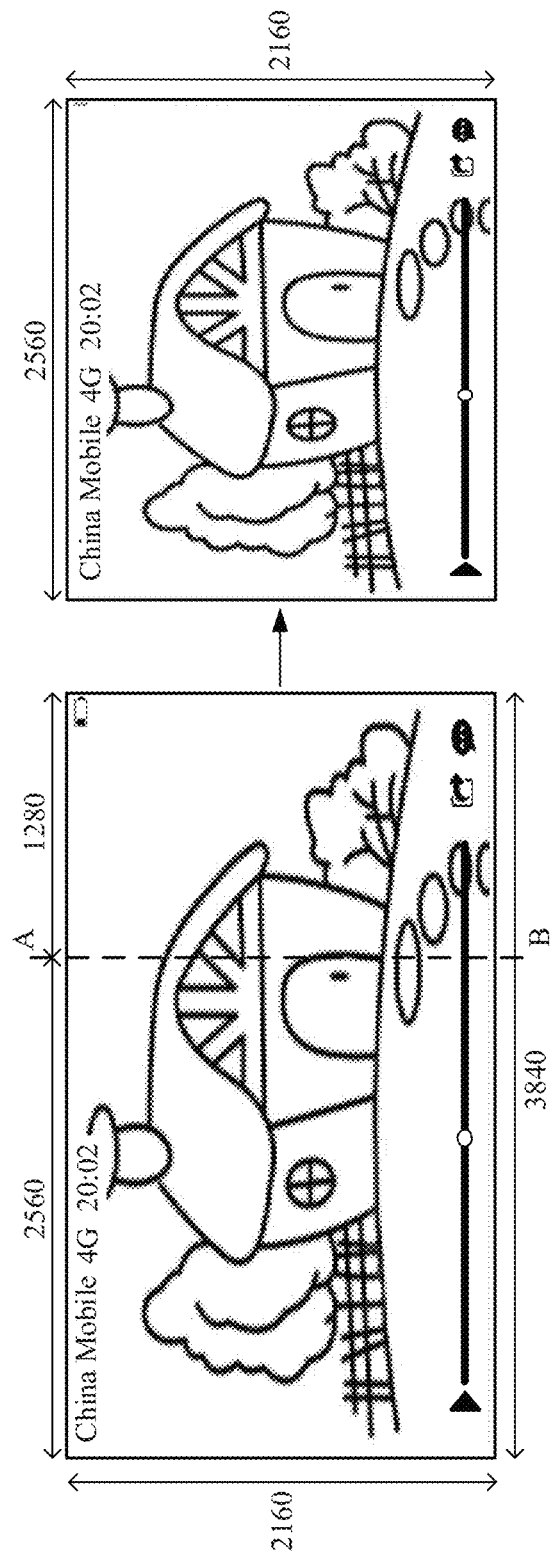
FIG. 15 is a schematic diagram 7 of a scenario of a display method for a flexible display according to an embodiment of this application.

Because the mobile phone has obtained display layout information of the first application when the first application is enabled, a maximum display aspect ratio supported when the first application is displayed or that the first application may support any display aspect ratio when the first application is displayed may be specified in the display layout information. Therefore, when the flexible display is switched from the first physical state to the second physical state, if it is specified, in the display layout information of the first application, that the first application can be displayed at any display aspect ratio, it indicates that regardless of an actual physical state of the flexible display in a current mobile phone, a corresponding display layout resource of the first application can be arranged for display. In this case, as shown in FIG. 15, after the flexible display is switched from the unfolded state to the folded state, the mobile phone may display the application window of the video APP in full screen in the display area 1 (namely, the second effective display area), so that the user obtains full-screen watching experience, and does not need to end an application process to recreate the application window.

Certainly, because the first application can be displayed at any display aspect ratio, the mobile phone may also display the application window of the first application at any ratio in the second effective display area. This is not limited in this embodiment of this application.

S1404. If the first application supports a fixed display aspect ratio, the mobile phone scales down/up display content in a first effective display area and displays the scaled-down/up display content in the second effective display area.

If it is specified, in the display layout information of the first application, that the first application supports a fixed maximum display aspect ratio (for example, 16:9), the mobile phone may not perform S1404 in some embodiments of this application, but perform S1404'. To be specific, the mobile phone may first destroy the created application window of the first application in the first effective display area, end a process of the first application, then automatically re-enable the first application, and recreate, according to the method in steps S702 to S706, the application window of the first application in the second effective display area based on the display aspect ratio supported by the first application and an aspect ratio of the second effective display area.

Therefore, to prevent the first application from being re-enabled due to a change of the physical state of the display in a running process, in some embodiments of this application, the window manager may scale down or scale up the display content of the first application in the first effective display area based on the resolution of the second effective display area.

Figure 16:
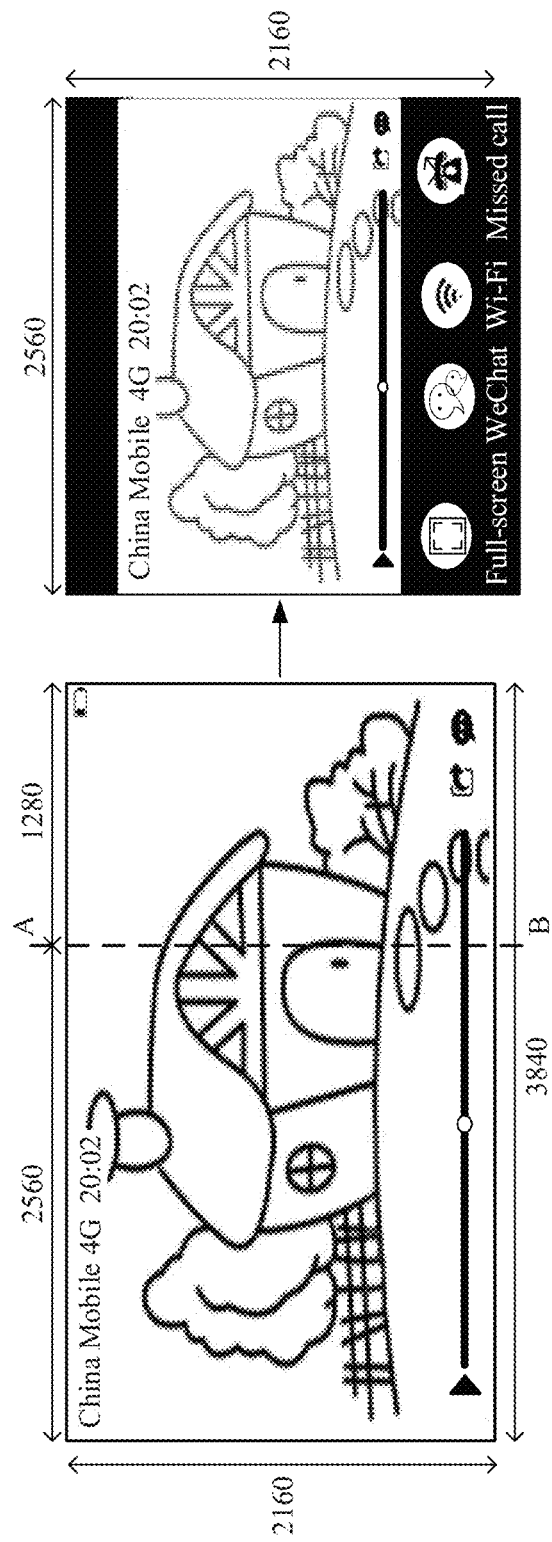
FIG. 16 is a schematic diagram 8 of a scenario of a display method for a flexible display according to an embodiment of this application.

For example, the mobile phone may proportionally scale down or scale up the display content of the first application in the first effective display area. As shown in FIG. 16, when the flexible display is in the unfolded state, a resolution of the first effective display area is 3840×2160, the application window of the first application is displayed in full screen in the first effective display area in a proportion of 16:9. After the flexible display is folded, the resolution of the second effective display area is 2560×2160. In this case, the window manager still scales down the application window of the first application in the first effective display area in a proportion of 16:9, so that the application window of the first application can be accommodated in the second effective display area, and a ratio of an application window of the first application in the second effective display area is still 16:9. In this way, the window manager may continue to display the application window of the first application in the second effective display area without changing the display aspect ratio. Because neither a display aspect ratio nor a display layout of the application window in the second effective display area changes, the mobile phone does not need to end a process of the first application to recreate the application window.

Figure 17:
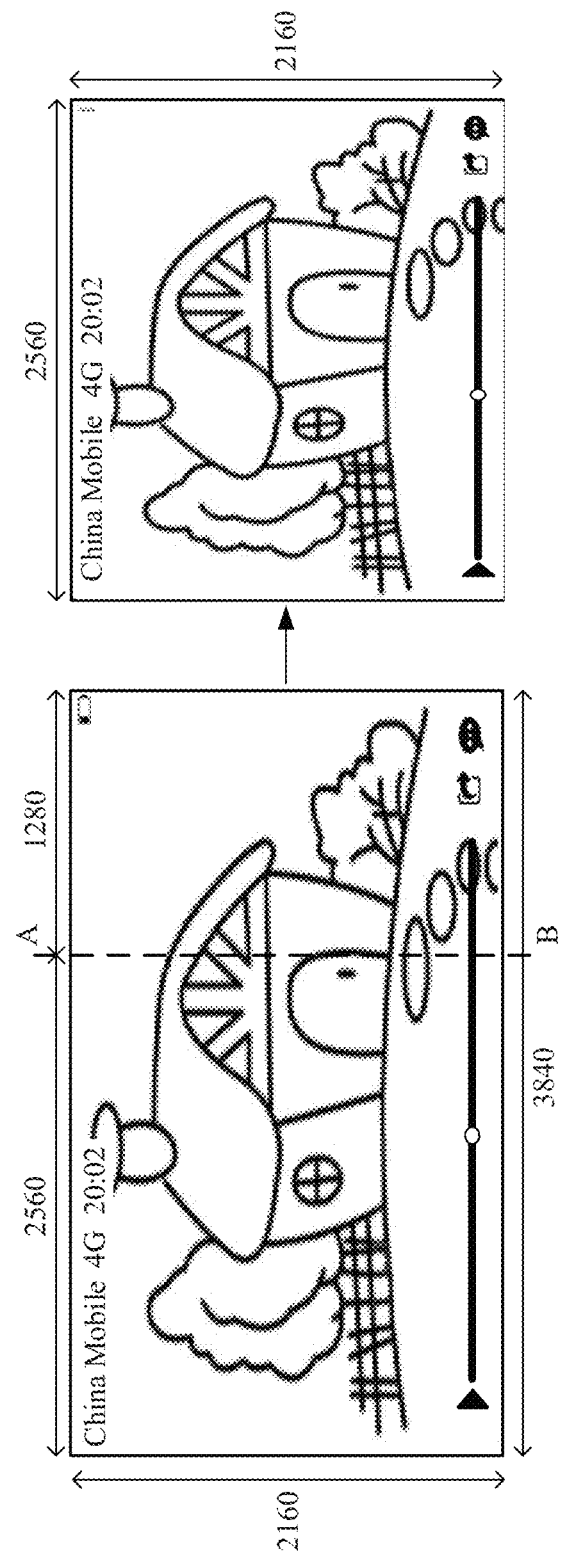
FIG. 17 is a schematic diagram 9 of a scenario of a display method for a flexible display according to an embodiment of this application.

For another example, the mobile phone may alternatively non-proportionally scale down or scale up the display content of the first application in the first effective display area. As shown in FIG. 17, when the flexible display is in the unfolded state, the resolution of the first effective display area is 3840×2160, the application window of the first application is displayed in full screen in the first effective display area in a proportion of 16:9. After the flexible display is folded, the resolution of the second effective display area is 2560×2160. In this case, because both a height of the first effective display area and a height of the second effective display area are 2160, the window manager may scale down the application window of the first application in the first effective display area in a width direction, so that the application window of the first application can be accommodated in the second effective display area, and the first application may be displayed in full screen in the second effective display area.

Figure 18:
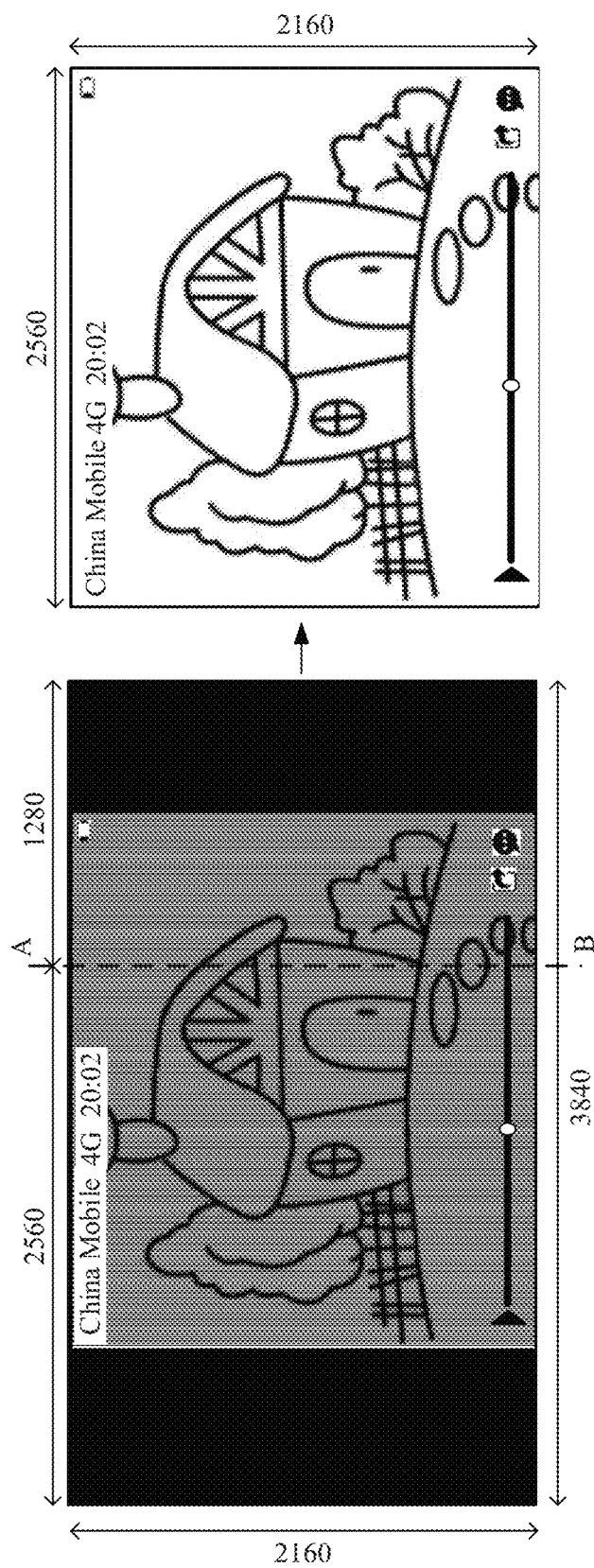
FIG. 18 is a schematic diagram 10 of a scenario of a display method for a flexible display according to an embodiment of this application.

For another example, as shown in FIG. 18, when the flexible display is in the unfolded state, the resolution of the first effective display area is 3840×2160, the application window of the first application is displayed in full screen in the first effective display area in a proportion of 4:3. After the flexible display is folded, the resolution of the second effective display area is 2880×2160. In other words, the resolution of the second effective display area is the same as the resolution of the application window of the first application. In this case, the window manager may change a location of the application window of the first application, to display the application window of the first application in full screen in the second effective display area. That is, if a display aspect ratio of the application window in the first effective display area is the same as an aspect ratio of the second effective display area, the mobile phone may display the application window in full screen in the second effective display area.

In addition, if the scaled-down application window in the first effective display area cannot completely fill the entire second effective display area, still as shown in FIG. 16, the mobile phone may be further provided with one or more shortcut keys in an area in the second effective display area other than the application window, for example, a full-screen key, an icon of an unread message, or an icon of a recently used application. This is not limited in this embodiment of this application.

In some other embodiments of this application, the mobile phone may alternatively preset, in the application configuration list, display aspect ratios supported by one or more applications when the flexible display is in different physical states. For example, a display aspect ratio supported by an application A when the flexible display is unfolded is 16:9, and the application A supports any display aspect ratio when the flexible display is folded. In this case, after the flexible display is switched from the first physical state to the second physical state, the mobile phone may determine the second effective display area on the flexible display in this case, and the mobile phone may query whether the currently running first application is in the application configuration list. If the currently running first application is in the application configuration list, the mobile phone may display the first application in the second effective display area based on a display aspect ratio that is set in the second physical state for the first application in the application configuration list.

In this case, by performing steps S1401 to S1404, in a process in which the mobile phone runs an application, the mobile phone may detect a change of the physical state of the current flexible display, to determine the second effective display area that can be used for display after the physical state of the flexible display changes, and further modify the parameters such as the resolution and the location of the application window with reference to a display aspect ratio supported by an application in display layout information of the application, so that the application window of the application can continue to be displayed in the second effective display area. In this way, when a physical state of a flexible display changes, a terminal may continue to display an application window of an application at a proper location on a folded display or an unfolded display, so that the user can obtain relatively good watching and operation experience when the flexible display is folded or unfolded.

It can be understood that, to implement the foregoing functions, the terminal, or the like includes corresponding hardware structures and/or software modules for performing the functions. A person skilled in the art should easily be aware that, in combination with the examples described in the embodiments disclosed in this specification, units, algorithm steps may be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal, or the like may be divided into function modules based on the foregoing method examples. For example, function modules corresponding to various functions are obtained through division, or two or more functions may be integrated into one processing module. The integrated module may be implemented in a form of hardware, or may be implemented in a form of a software function module. It should be noted that, in the embodiments of this application, division into modules is an example, and is merely a logical function division. In actual implementation, another division manner may be used.

Figure 19:
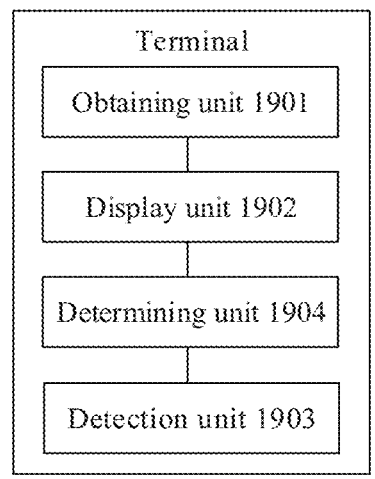
FIG. 19 is a schematic structural diagram 2 of a terminal according to an embodiment of this application.

In some embodiments of this application, an embodiment of this application discloses a terminal. As shown in FIG. 19, the terminal is configured to implement the method recorded in the foregoing methods embodiments, and the terminal includes an obtaining unit 1901, a display unit 1902, a detection unit 1903, and a determining unit 1904. The obtaining unit 1901 is configured to support the terminal in performing the processes S701 to S703 in FIG. 7. The display unit 1902 is configured to support the terminal in performing the processes S704 to S706 in FIG. 7 and the processes S1403 to S1404 in FIG. 14. The detection unit 1903 is configured to support the terminal in performing the process S1401 in FIG. 14. The determining unit 1904 is configured to support the terminal in performing the process S1402 in FIG. 14. All related content of the steps in the foregoing method embodiments may be cited in function descriptions of the corresponding function modules. Details are not described herein again.

Figure 20:
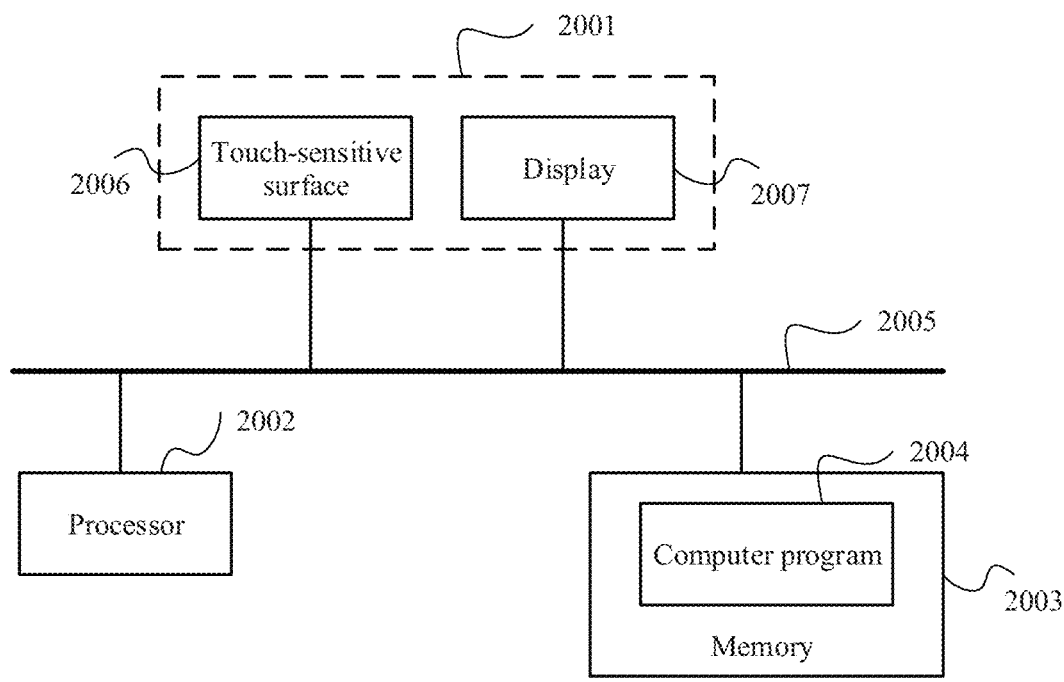
FIG. 20 is a schematic structural diagram 3 of a terminal according to an embodiment of this application.

In some other embodiments of this application, an embodiment of this application discloses a terminal. As shown in FIG. 20, the terminal may include a flexible display 2001, where the flexible display 2001 includes a touch-sensitive surface 2006 and a display 2007, and a physical state of the flexible display 2001 includes a folded state and an unfolded state; one or more processors 2002; a memory 2003; one or more applications (not shown); and one or more computer programs 2004. The foregoing components may be connected by using one or more communications buses 2005. The one or more computer programs 2004 are stored in the memory 2003 and are configured to be executed by the one or more processors 2002. The one or more computer programs 2004 include an instruction, and the instruction may be used to perform the steps in FIG. 7, FIG. 14, and the corresponding embodiments.

An embodiment of this application further provides a computer storage medium. The computer storage medium stores computer program code, and when the foregoing processor executes the computer program code, the terminal performs related method steps in FIG. 7 or FIG. 14 to implement the display method for a flexible display in the foregoing embodiments.

An embodiment of this application further provides a computer program product. When the computer program product is run on a computer, the computer is enabled to perform related method steps in FIG. 7 or FIG. 14 to implement the display method for a flexible display in the foregoing embodiments.

The terminal, the computer storage medium, or the computer program product provided in the embodiments of this application are all configured to perform the corresponding methods provided above. Therefore, for beneficial effects that can be achieved thereof, refer to the beneficial effects in the corresponding methods provided above. Details are not described herein again.

It may be understood that the embodiments of the present invention are described based on the accompanying drawings in this specification. Each of the accompanying drawings in the specification may be understood as an embodiment.

The foregoing descriptions about implementations allow a person skilled in the art to understand that, for the purpose of convenient and brief description, division into the foregoing function modules is used as an example for description. In actual application, the foregoing functions can be allocated to different function modules and completed based on a requirement, that is, an inner structure of an apparatus is divided into different function modules to implement all or some of the functions described above. For a detailed working process of the foregoing apparatus and unit, refer to a corresponding process in the foregoing method embodiments. Details are not described herein again.

Function units in the embodiments of this application may be integrated into one processing unit, or each of the units may exist alone physically, or two or more units are integrated into one unit. The foregoing integrated unit may be implemented in a form of hardware, or may be implemented in a form of software and hardware.

When the integrated unit is implemented in the form of software and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:
    receiving, from a user, a first operation of enabling a first application on a flexible display of a terminal, wherein the flexible display is in a first physical state;
    obtaining display layout information of the first application indicating a display aspect ratio supported by the first application when displaying;
    detecting whether the first application supports displaying any aspect ratio;
    displaying, based on the display layout information, based on a first effective display area on the flexible display in the first physical state, and based on whether the first application supports displaying any aspect ratio, an application window of the first application in the first effective display area by:
        displaying, based on a first aspect ratio of the first effective display area, the application window in a full screen in the first effective display area when the first application supports displaying any aspect ratio;
        displaying, based on the first aspect ratio of the first effective display area, the application window in the full screen in the first effective display area when the display aspect ratio is not less than the first aspect ratio of the first effective display area, wherein the display aspect ratio is a maximum display aspect ratio supported by the first application; and
        displaying, based on the display aspect ratio, the application window in a third area when the display aspect ratio is less than the first aspect ratio, wherein the third area is located in the first effective display area, and wherein the display aspect ratio is the maximum display aspect ratio supported by the first application;

detecting that the flexible display is switched from the first physical state to a second physical state; and displaying, in response to detecting that the flexible display is switched from the first physical state to the second physical state, the application window in a second effective display area on the flexible display, wherein the second effective display area is different from the first effective display area.

2. The method of claim 1, further comprising obtaining physical state information of the flexible display, wherein physical states of the flexible display comprise a folded state and an unfolded state, wherein the first effective display area is an entire flexible display when the flexible display is in the unfolded state, and wherein the first effective display area is a first area of a plurality of second areas that are obtained by dividing the flexible display along a folding line when the flexible display is in the folded state.

3. The method of claim 1, wherein when the display aspect ratio is less than the first aspect ratio, the method further comprises displaying a shortcut key in a fourth area, and wherein the fourth area is an area other than the third area in the first effective display area.

4. The method of claim 1, further comprising:
storing an application configuration list comprising a second application and a second maximum display aspect ratio supported by the second application; and
displaying, based on a first maximum display aspect ratio supported by the first application in the application configuration list when the application configuration list comprises the first application, the application window in the first effective display area.

5. The method of claim 1, further comprising identifying that currently-obtained first physical state information is different from a last obtained second physical state information, wherein detecting that the flexible display is switched from the first physical state to the second physical state comprises detecting, in response to the identifying, that the flexible display is switched from the first physical state to the second physical state.

6. The method of claim 1, wherein after detecting that the flexible display is switched from the first physical state to the second physical state, the method further comprises displaying, based on the display layout information, the application window in the second effective display area.

7. The method of claim 6, further comprising:
displaying the application window in the full screen in the second effective display area when the first application supports displaying any aspect ratio; and
displaying, based on a resolution of the application window in the first effective display area, the application window in the second effective display area when the first application does not support displaying any aspect ratio.

8. The method of claim 7, further comprising:
displaying the application window in the full screen when a second aspect ratio of the application window in the first effective display area is the same as a third aspect ratio of the second effective display area; and
when the second aspect ratio is different from the third aspect ratio:
scaling the application window to obtain a scaled application window; and
displaying the scaled application window in the second effective display area.

9. The method of claim 8, wherein scaling the application window comprises proportionally scaling, based on the second aspect ratio, the application window to obtain the scaled application window.

10. The method of claim 1, wherein after detecting that the flexible display is switched from the first physical state to the second physical state, the method further comprises terminating the application window in the first effective display area.

11. The method of claim 1, wherein when displaying the application window in the full screen in the first effective display area, the application window and the first effective display area are a same size.

12. An apparatus, comprising:
a flexible display configured to be in a plurality of physical states, wherein the physical states comprise a folded state and an unfolded state; and
one or more processors coupled to the flexible display and configured to:
receive, from a user, a first operation of enabling a first application on the flexible display, wherein the flexible display is in a first physical state;
obtain display layout information of the first application indicating a display aspect ratio supported by the first application when displaying;
detect whether the first application supports displaying any aspect ratio;
display, based on the display layout information, based on a first effective display area on the flexible display in the first physical state, and based on whether the first application supports displaying any aspect ratio, an application window of the first application in the first effective display area by:
displaying, based on a first aspect ratio of the first effective display area, the application window in a full screen in the first effective display area when the first application supports displaying any aspect ratio;
displaying, based on the first aspect ratio of the first effective display area, the application window in the full screen in the first effective display area when the display aspect ratio is not less than the first aspect ratio of the first effective display area, wherein the display aspect ratio is a maximum display aspect ratio supported by the first application; and
displaying, based on the display aspect ratio, the application window in a first area when the display aspect ratio is less than the first aspect ratio, wherein the first area is located in the first effective display area, and wherein the display aspect ratio is the maximum display aspect ratio supported by the first application;
detect that the flexible display is switched from the first physical state to a second physical state; and
display, in response to detecting that the flexible display is switched from the first physical state to the second physical state, the application window in a second effective display area on the flexible display,
wherein the second effective display area is different from the first effective display area.

13. The apparatus of claim 12, wherein the display aspect ratio is less than the first aspect ratio, wherein the one or more processors are further configured to display a shortcut key in a second area, and wherein the second area is an area other than the first area in the first effective display area.

14. The apparatus of claim 12, wherein the one or more processors are further configured to:
- store an application configuration list comprising a second application and a second maximum display aspect ratio supported by the second application; and
- display, based on a first maximum display aspect ratio supported by the first application in the application configuration list when the application configuration list comprises the first application, the application window in the first effective display area.

15. The apparatus of claim 12, wherein the one or more processors are further configured to:
- identify currently obtained first physical state information is different from a last obtained second physical state information; and
- further detect, in response to the identifying, that the flexible display is switched from the first physical state to the second physical state.

16. The apparatus of claim 12, wherein after detecting that the flexible display is switched from the first physical state to the second physical state, the one or more processors are further configured to display, based on the display layout information, the application window in the second effective display area.

17. The apparatus of claim 16, wherein the one or more processors are further configured to:
- display the application window in the full screen in the second effective display area when the first application supports displaying any aspect ratio; and
- display, based on a resolution of the application window in the first effective display area, the application window in the second effective display area when the first application does not support displaying any aspect ratio.

18. The apparatus of claim 17, wherein the one or more processors are further configured to:
- display the application window in the full screen when a second aspect ratio of the application window in the first effective display area is the same as a third aspect ratio of the second effective display area; and
- when the second aspect ratio is different from the third aspect ratio:
  - scale the application window to obtain a scaled application window; and
  - display the scaled application window in the second effective display area.

19. The apparatus of claim 18, wherein the one or more processors are further configured to:
- proportionally scale, based on the second aspect ratio, the application window to obtain the scaled application window; and
- display the scaled application window in the second effective display area.

20. A computer program product comprising instructions stored on a non-transitory computer-readable medium that, when executed by one or more processors, cause an apparatus to:
- receive, from a user, a first operation of enabling a first application on a flexible display of a terminal, wherein the flexible display is in a first physical state;
- obtain display layout information of the first application indicating a display aspect ratio supported by the first application when displaying;
- detect whether the first application supports displaying any aspect ratio;
- display, based on the display layout information, based on a first effective display area on the flexible display in the first physical state, and based on whether the first application supports displaying any aspect ratio, an application window of the first application in the first effective display area by:
  - displaying, based on a first aspect ratio of the first effective display area, the application window in a full screen in the first effective display area when the first application supports displaying any aspect ratio;
  - displaying, based on the first aspect ratio of the first effective display area, the application window in the full screen in the first effective display area when the display aspect ratio is not less than ti first aspect ratio of the first effective display area, wherein the display aspect ratio is a maximum display aspect ratio supported by the first application; and
  - displaying, based on the display aspect ratio, the application window in a third area when the display aspect ratio is less than the first aspect ratio, wherein the third area is located in the first effective display area, and wherein the display aspect ratio is the maximum display aspect ratio supported by the first application;
- detect that the flexible display is switched from the first physical state to a second physical state; and
- display, in response to detecting that the flexible display is switched from the first physical state to the second physical state, the application window in a second effective display area on the flexible display,
- wherein the second effective display area is different from the first effective display area.

* * * * *

UNITED STATES PATENT AND TRADEMARK OFFICE
CERTIFICATE OF CORRECTION

PATENT NO. : 12,032,410 B2
APPLICATION NO. : 17/253869
DATED : July 9, 2024
INVENTOR(S) : Xiaoxiao Chen et al.

It is certified that error appears in the above-identified patent and that said Letters Patent is hereby corrected as shown below:

In the Claims

Claim 20, Column 40, Line 31: "than ti first" should read "than the first"

Signed and Sealed this
Third Day of September, 2024

Katherine Kelly Vidal
Director of the United States Patent and Trademark Office